US010802675B2

(12) United States Patent
Kano

(10) Patent No.: US 10,802,675 B2
(45) Date of Patent: Oct. 13, 2020

(54) INFORMATION PROCESSING APPARATUS AND NON-TRANSITORY COMPUTER READABLE MEDIUM STORING INFORMATION PROCESSING PROGRAM

(71) Applicant: FUJI XEROX CO.,LTD., Tokyo (JP)

(72) Inventor: Yusuke Kano, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 148 days.

(21) Appl. No.: 15/996,530

(22) Filed: Jun. 4, 2018

(65) Prior Publication Data
US 2019/0095055 A1 Mar. 28, 2019

(30) Foreign Application Priority Data
Sep. 28, 2017 (JP) ................. 2017-187340

(51) Int. Cl.
*G06F 3/0482* (2013.01)
*G06F 3/0484* (2013.01)
*G06F 3/01* (2006.01)
*G06Q 10/10* (2012.01)
*G06F 3/14* (2006.01)

(52) U.S. Cl.
CPC ............ *G06F 3/0482* (2013.01); *G06F 3/011* (2013.01); *G06F 3/04845* (2013.01); *G06Q 10/10* (2013.01); *G06Q 10/101* (2013.01); *G06F 3/1423* (2013.01)

(58) Field of Classification Search
CPC .... G06F 3/0482; G06F 3/011; G06F 3/04845; G06F 3/1423; G06Q 10/10; G06Q 10/101
USPC ......................................................... 715/769
See application file for complete search history.

(56) References Cited

U.S. PATENT DOCUMENTS 7,213,211 B1 * 5/2007 Sanders .................. G09B 5/08
715/753
2014/0380152 A1 12/2014 Noguchi et al.

FOREIGN PATENT DOCUMENTS

| JP | 5212310 | 6/2013 |
| JP | 5733342 | 6/2015 |
| JP | 2015158915 | 9/2015 |
| JP | 2016004428 | 1/2016 |

* cited by examiner

*Primary Examiner* — Andrey Belousov
(74) *Attorney, Agent, or Firm* — JCIPRNET

(57) ABSTRACT

An information processing apparatus includes a connection unit that connects second mounts related to plural tags to each other in accordance with a relationship between the plural tags, on a first mount to which the tags related to the second mounts are attachable.

12 Claims, 21 Drawing Sheets

FIG. 10

| 1010 | 1012 | 1015 | 1020 | 1025 | 1030 | 1035 | 1040 | 1045 |
|---|---|---|---|---|---|---|---|---|
| TAG ID | MOUNT ID | ATTACHMENT POSITION | SIZE | CREATION DATE AND TIME | CREATOR | ATTACHMENT DATE AND TIME | COLOR | FRAME LINE SHAPE |
| F0001 | D0001 | (100, 200) | (10, 5) | | KF | | | |

| 1050 | 1055 | 1060 | 1065 | 1070 | 1075 | 1080 |
|---|---|---|---|---|---|---|
| FRAME LINE COLOR | FRAME LINE THICKNESS | BELONGING GROUP | MOUNT LINK FLAG | LINK DESTINATION MOUNT ID | CONTENT TYPE | CONTENT |
| | | | | | TEXT | |

1000

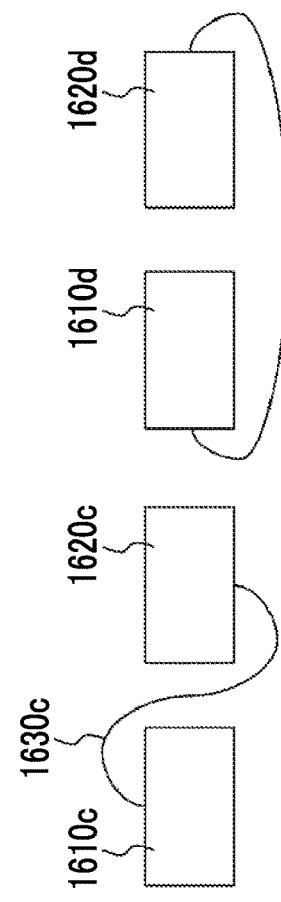
FIG. 16A1
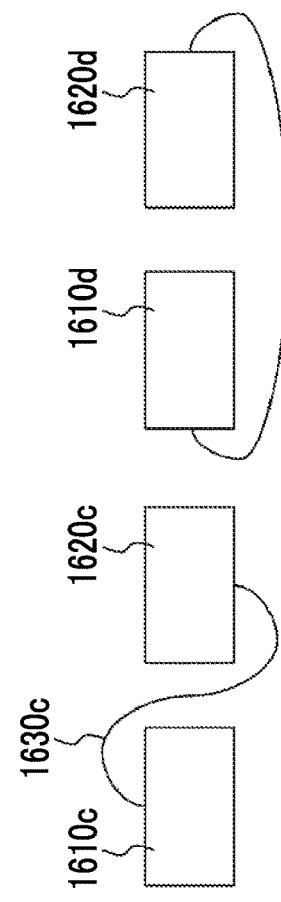
FIG. 16B1
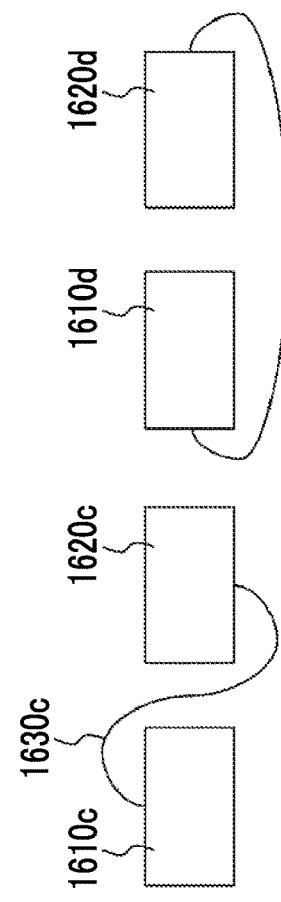
FIG. 16C1
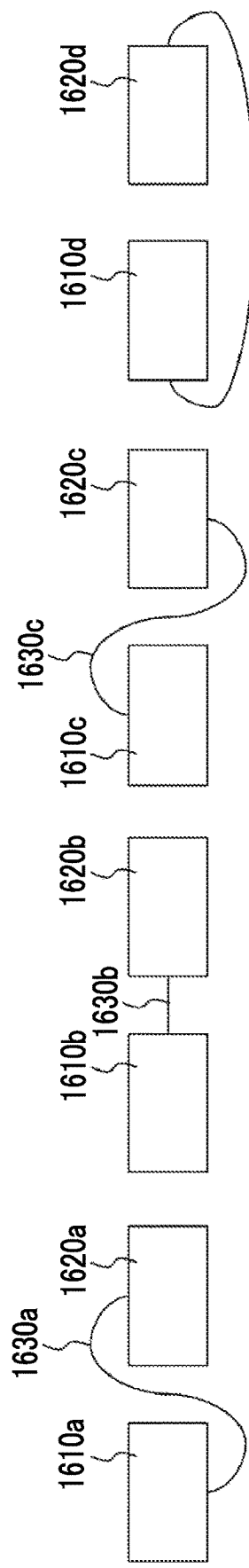
FIG. 16D1
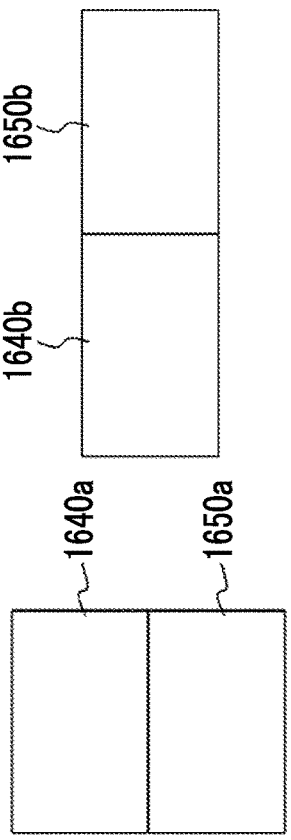
FIG. 16A2
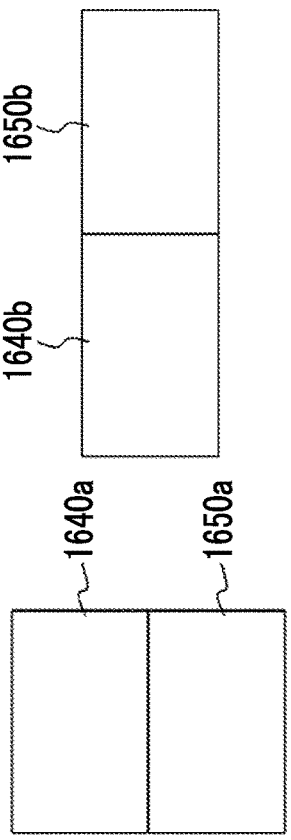
FIG. 16B2
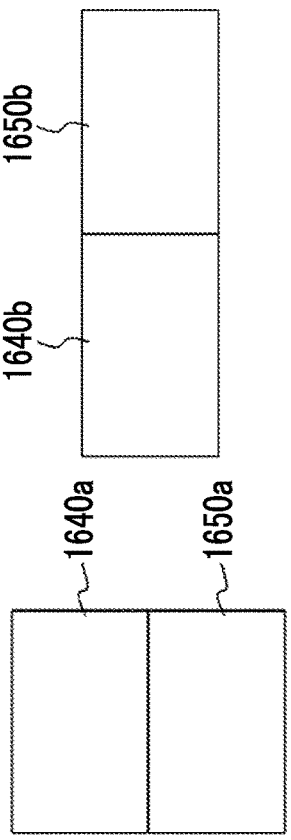
FIG. 16C2
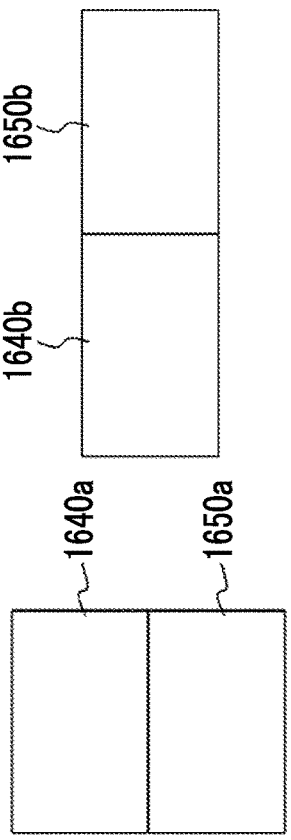
FIG. 16D2

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-187340 filed Sep. 28, 2017.

BACKGROUND

Technical Field

The present invention relates to an information processing apparatus and a non-transitory computer readable medium storing an information processing program.

SUMMARY

According to an aspect of the invention, there is provided an information processing apparatus including a connection unit that connects second mounts related to plural tags to each other in accordance with a relationship between the plural tags, on a first mount to which the tags related to the second mounts are attachable.

BRIEF DESCRIPTION OF THE DRAWINGS

Exemplary embodiment(s) of the present invention will be described in detail based on the following figures, wherein:

FIG. 10 is a diagram illustrating an example of a data structure of a tag information table;

FIGS. 16A1 to 16D2 are diagrams illustrating a processing example according to the first exemplary embodiment;

DETAILED DESCRIPTION

Hereinafter, examples of various exemplary embodiments in realizing the invention will be described with reference to the accompanying drawings.

First Exemplary Embodiment

Figure 1:
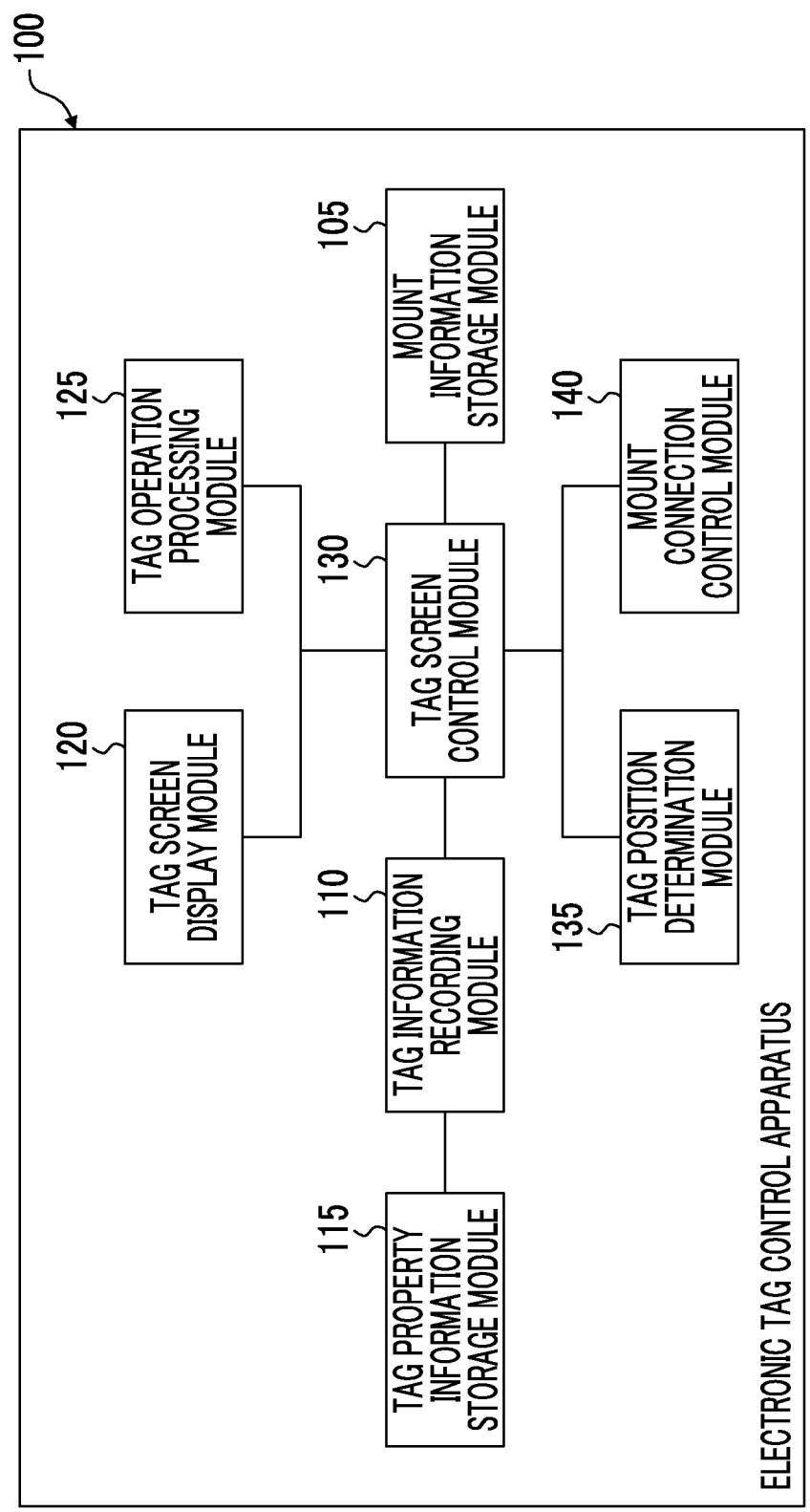
FIG. 1 is a conceptual module configuration diagram illustrating a configuration example according to a first exemplary embodiment.

FIG. 1 is a conceptual module configuration diagram illustrating a configuration example of a first exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

In addition, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication line, and registers, and the like inside a central processing unit (CPU).

An electronic tag control apparatus 100 (an example of an information processing apparatus) which is the first exemplary embodiment performs processing related to a mount and a tag (also referred to as an electronic tag, an electronic card, or the like) which are used at an assembly, and includes a mount information storage module 105, a tag information recording module 110, a tag property information storage module 115, a tag screen display module 120, a tag operation processing module 125, a tag screen control module 130, a tag position determination module 135, and a mount connection control module 140 as illustrated in the example of FIG. 1. Meanwhile, the term "assembly" as mentioned herein may be a meeting in which plural persons gather and talk with each other, and examples of the assembly include a conference, a workshop, an idea extraction meeting, an examination meeting, a consultation, a discussion, a gathering, a meeting, and the like. This exemplary embodiment relates to an electronic tag system (also referred to as an electronic white board and the like) which uses an electronic tag and a mount.

Specifically, the electronic tag control apparatus 100 is used at an assembly performed by a facilitator (generally, one facilitator) and plural participants by using a tag. The participant creates a tag having an idea and the like written thereon by using an electronic tag terminal 250 as a terminal for a participant. In general, as illustrated in examples of FIGS. 3A to 3C, there are plural electronic tag terminals 250 including an electronic tag terminal 250A, an electronic tag terminal 250B, and the like (hereinafter, representatively referred to as an electronic tag terminal 250) which are owned by the respective participants. The electronic tag control apparatus 100 receives a tag from the electronic tag terminal 250 and attaches the tag onto a mount (or a background). The facilitator determines or changes the position of a tag, arranges tags (also referred to as the association of a first tag with a second tag, the formation of a group, and the like), or performs the creation of tag information, and the like by himself or herself on the mount by using a shared screen which is a display apparatus of the electronic tag control apparatus 100 to progress the assembly. Meanwhile, in this exemplary embodiment, the participant includes a facilitator.

In a case where the exchange of a tag is performed between mounts, the tag has to be moved (deleted) from a mount which is a movement source and has to be attached to a new mount which is an attachment destination designated.

In order to graphically move a tag between mounts, plural mounts can be displayed on one screen, but it takes time and effort to select a target mount.

Consequently, in the electronic tag control apparatus 100 which is an electronic tag system, a mount is associated with a tag to be capable of perform the following processing. The wording "the association of the mount with the tag" may refer to, for example, the provision of link information indicating the mount to the tag.

(1) The connection of the mount which is a link destination by an operation of superimposing the tag associated with the mount.

(2) Making the tag across a connection side movable between the connected mounts.

Meanwhile, movement other than being across the connect ion side is normal movement. In addition, the connection side refers to a side of a connected portion (a side superimposed by connection in mutual rectangular sides) in a case where two rectangular mounts are connected to each other.

The mount information storage module 105 is connected to the tag screen control module 130. The mount information storage module 105 stores information on a mount. For example, the mount information storage module stores a flag indicating whether the mount is a first mount or a second mount, and the like. Specifically, the mount information storage module stores a mount information table 900 illustrated in an example of FIG. 9 to be described later, and the like.

The tag information recording module 110 is connected to the tag property information storage module 115 and the tag screen control module 130. The tag information recording module 110 stores information (for example, property information and the like) on a tag in the tag property information storage module 115 under the control of the tag screen control module 130.

The tag property information storage module 115 is connected to the tag information recording module 110. The tag property information storage module 115 stores property information of each tag under the control of the tag information recording module 110. Examples of the property information to be stored include a mount ID of a mount to which the tag is attached, an attachment position of the tag in the mount, the size of the tag, a flag indicating whether or not the tag is a tag related to the mount, and the like. Specifically, the tag property information storage module stores a tag information table 1000 illustrated in an example of FIG. 10 to be described later. In addition, the tag property information storage module may store a list of tags attached to the mount. Specifically, the tag property information storage module may store a list of tag IDs, and the like for each mount.

The tag screen display module 120 is connected to the tag screen control module 130. The tag screen display module 120 controls display on a display apparatus, such as a liquid crystal display (particularly, a large-scale liquid crystal display), which is connected to the electronic tag control apparatus 100. An operation of a facilitator or the like is reflected, or a tag transmitted from the electronic tag terminal 250 is displayed.

The tag operation processing module 125 is connected to the tag screen control module 130. The tag operation processing module 125 receives an operation with respect to a tag or a mount by the facilitator or the like, and performs processing based on the operation. Here, examples of the operation with respect to the tag include the creation of the tag, the movement of the tag, the enlargement and reduction of the size, the change of properties (for example, color and the like) of the tag, grouping, and the like. In addition, examples of the operation with respect to the mount may include the change of the mount, the movement of the tag which is accompanied with the change of the mount, the association of the mount and the tag (the generation of the tag associated with the mount), and the like.

The tag screen control module 130 is connected to the mount information storage module 105, the tag information recording module 110, the tag screen display module 120, the tag operation processing module 125, the tag position determination module 135, and the mount connection control module 140. The tag screen control module 130 controls processing of the entire electronic tag control apparatus 100. For example, the tag screen control module transmits information on a tag and a mount to the electronic tag terminal 250, receives information on the tag from the electronic tag terminal 250, and attaches the information onto the mount. In addition, the tag screen control module performs the connection of plural mounts, and the like.

The tag position determination module 135 is connected to the tag screen control module 130. The tag position determination module 135 extracts a relationship between plural tags related to the second mount on the first mount, and determines whether or not the relationship is a relationship for connecting the second mounts to each other. The first mount, which is a mount for enabling a mount connection operation, is a mount (hereinafter, also referred to as a shared mount) which is capable of being shared by plural operators. The second mount, which is a mount used by each person in charge (operator), is a mount (hereinafter, also referred to as a working mount) on which working is mainly performed. The mount is a mount serving as a target for connection.

The wording "the tag related to the second mount" refers to the correspondence of the tag and the second mount (it may be said that the tag is represented by or replaced with the second mount), and means that the second mount is designated in a case where the tag is designated on the first mount. Specifically, the correspondence can be realized by attaching a link to the second mount onto the tag.

For example, the "relationship between plural tags" is generated by an operation of an operator (for example, a facilitator) of the first mount. Specifically, the relationship includes (1) "superimposition of the tags on each other" (will be described later with reference to FIGS. 11 and 12), (2) "bringing of the tags close to each other within a predetermined distance" (will be described later with reference to FIGS. 13 and 14), (3) "connection of both tags to each other by using a line indicating connection" (will be described later with reference to FIG. 15 and FIGS. 16A1 to 16D2), and the like. Among these, determination of whether the operations of "superimposition of the tags" and "bringing of the tags close to each other within a predetermined distance" have been performed can be performed by extracting the positions of the tags. Determination of whether "connection of both tags to each other by using a line indicating connection" can be performed using a connection line connecting the tags.

The mount connection control module 140 is connected to the tag screen control module 130. The mount connection control module 140 connects the second mount related to plural tags in accordance with a relationship between the tags (a determination result of the tag position determination module 135) on the first mount to which the tags related to the second mount can be attached. Meanwhile, the number of mounts to be connected may be two, or may be three or more. Hereinafter, a description will be given by mainly using two mounts as targets. However, in a case of connection of three or more mounts, the mounts may be connected in accordance with a relationship between three or more tags (tags related to the second mount), or processing for further connecting a mount to the connected two mounts may be performed.

Here, as "the relationship between tags", any one of a positional relationship in a case where the tags are superimposed on each other and a positional relationship in a case where a distance between tags is within a predetermined distance may be used.

The mount connection control module 140 may determine a side (also referred to as a connection side) for connecting the second mounts to each other in accordance with the positional relationship to perform connection.

In addition, as "the relationship between tags", a relationship generated by a line connecting the tags to each other may be used.

The mount connection control module 140 may determine a side for connecting the second mounts to each other in accordance with the side between the connected tags to perform connection.

In addition, the tag operation processing module 125 may move or copy a tag attached onto one second mount to the other second mount between plural second mounts connected to each other. The tag operation processing module 125 receives an operation of moving or copying the tags across the side connected between the second mounts connected to each other, by an operation of a user, and performs the movement or copying processing. Meanwhile, the movement or copying operation between the mounts connected to each other is the same as a movement or copying operation of tags on a single second mount. That is, the user can move or copy a tag between mounts, similar to a movement or copying operation of tags in a general mount (without any discomfort).

Figure 2:
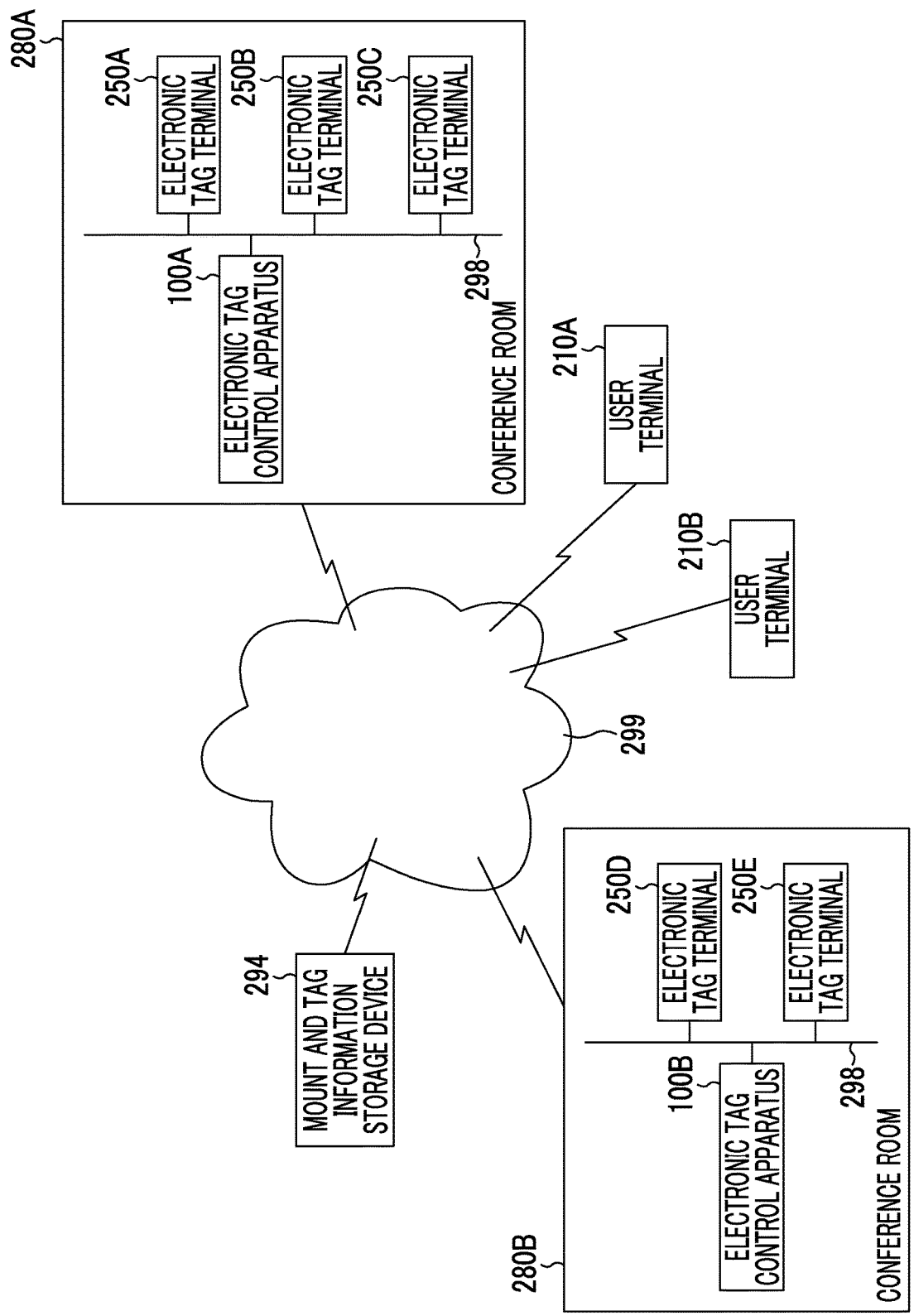
FIG. 2 is a diagram illustrating a configuration example of an electronic tag system using this exemplary embodiment.

FIG. 2 is a diagram illustrating a configuration example of an electronic tag system using this exemplary embodiment.

The electronic tag control apparatus 100 generally includes a display apparatus of a large screen, and is operated by a facilitator. The display apparatus can be viewed by all participants. Each electronic tag terminal 250 is operated by a participant at an assembly, and each participant generally owns one electronic tag terminal. For example, a tablet type terminal and the like can be used as the electronic tag terminal 250.

In the example of FIG. 2, an electronic tag control apparatus 100A, an electronic tag terminal 250A, an electronic tag terminal 250B, and an electronic tag terminal 250C are installed at a conference room 280A, and an assembly is performed in the conference room. The electronic tag control apparatus 100A, the electronic tag terminal 250A, the electronic tag terminal 250B, and the electronic tag terminal 250C are connected to each other through a communication line 298. The communication line 298 may be a wireless line, a wired line, or a combination thereof, and may be, for example, the Internet, an intranet, or the like as communication infrastructure.

In addition, an electronic tag control apparatus 100B, an electronic tag terminal 250D, and an electronic tag terminal 250E are installed at a conference room 280B, and an assembly is performed in the conference room. The electronic tag control apparatus 100B, the electronic tag terminal 250D, and the electronic tag terminal 250E are connected to each other through the communication line 298.

A user terminal 210A, a user terminal 210B, a mount and tag information storage device 294, devices within the conference room 280A, and devices within the conference room 280B are connected to each other through a communication line 299. In addition, the function of the mount and tag information storage device 294 may be realized as a cloud service.

The mount and tag information storage device 294 stores information on a tag. Each electronic tag control apparatus 100 performs processing by using the mount and tag information storage device 294. In this case, information on a mount and a tag within the mount and tag information storage device 294 may be shared by plural electronic tag control apparatuses 100. That is, information on a mount and a tag which are managed by the electronic tag control apparatus 100A may be used by the electronic tag control apparatus 100B.

In addition, for example, a mount (second mount) on which work is performed by each electronic tag terminal 250 may be connected by a mount (first mount) operated by the electronic tag control apparatus 100.

Figure 3A:
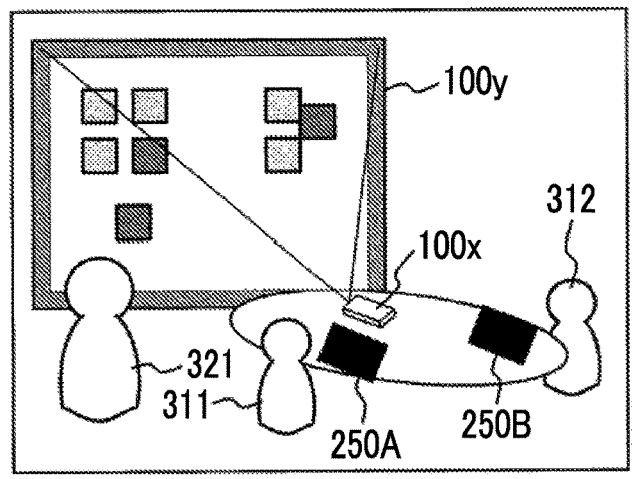
FIGS. 3A to 3C are diagrams illustrating an example of the use of an electronic tag terminal and an electronic tag control apparatus at a conference room or the like in which this exemplary embodiment is used.
Figure 3B:
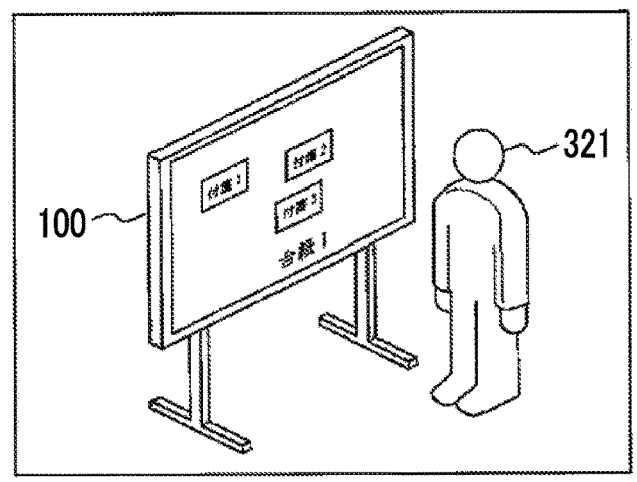
Figure 3C:
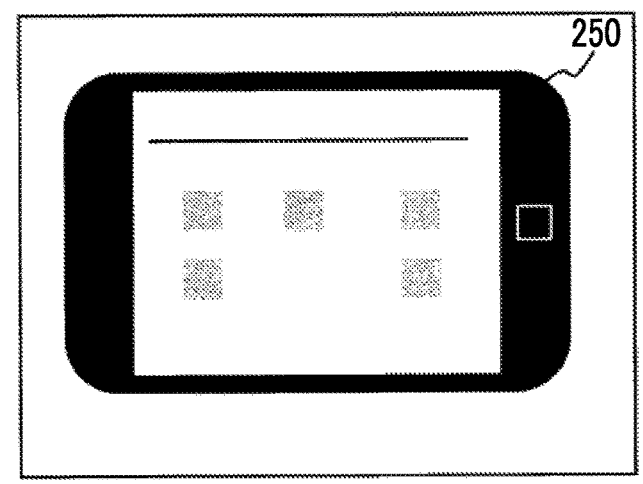

FIGS. 3A to 3C are diagrams illustrating examples of the use of the electronic tag terminal 250 and the electronic tag control apparatus 100 at a conference room or the like in which this exemplary embodiment is used.

As illustrated in the example of FIG. 3A, participants 311 and 312 and a facilitator 321 are gathered in a conference room or the like. The participant 311 uses the electronic tag terminal 250A, and the participant 312 uses the electronic tag terminal 250B. In general, one terminal apparatus (electronic tag terminal 250A or the like) is given to each participant. The terminal apparatus is a tablet type terminal which is as large as a notebook (for example, A4, B5, 7 inches to 10 inches, or the like) like the electronic tag terminal 250 illustrated in the example of FIG. 3C, and is operated using a finger, a pen, or the like. Tag information including text data, a handwritten character, a figure, or the like is created by the participant. Meanwhile, the terminal apparatus is not limited to the tablet-type terminal, and may be a PC (a notebook PC is included) which includes a keyboard, a mouse, and the like.

An electronic tag control apparatus 100x illustrated in the example of FIG. 3A is a projector, and displays a mount and a tag. In addition, an electronic tag control apparatus 100y, which is an electronic white board, detects the motion of a finger of the facilitator 321, a pen, or the like and receives operations such as the attachment of a tag to a mount (table), the movement of the tag, and the association (grouping) of the tag. For example, the electronic tag control apparatus 100y includes a pen, and receives operations with respect to the mount and the tag by the separation of the pen from a predetermined pen holder (the lift-up of the pen in order for the facilitator 321 to perform an operation) and by detecting the position of the tip end of the pen (the touch of the tip end of the pen on the electronic tag control apparatus 100y, or the like). For example, the pen holder is provided with a sensor (a sensor which is switched on or off by the gravity of the pen, or the like), and it may be detected which pen among plural pens (a black pen, a red pen, a blue pen, and the like) is used. In addition, the entire display screen of the electronic tag control apparatus 100y is a touch sensor, and a touch position of the display screen and pressure may be detected. In this example, the turn-on and turn-off of the pen is controlled by the pen holder, but the pen holder is not necessarily required to be provided. The turn-on and turn-off of the pen may be directly controlled on the pen side. Regarding the change of color, the color may be changed by preparing a color palette at a portion on the display screen and touching a target color by a pen (or something similar to a pen) without requiring a pen holder, or a pen may be equipped with a function (a button, a slider, or the like) for giving an instruction for changing color.

In addition, the electronic tag control apparatus 100 may be an electronic board as illustrated in the example of FIG. 3B. The electronic board generally includes a large-screen display apparatus (larger than at least the display apparatus of the electronic tag terminal 250), and the display apparatus is a touch panel and detects a touched position of the display screen and pressure. For example, the screen may be a screen having a size of 80 inches, or the like.

An example of a mount connection process will be described with reference to FIGS. 4 to 8.

Figure 4:
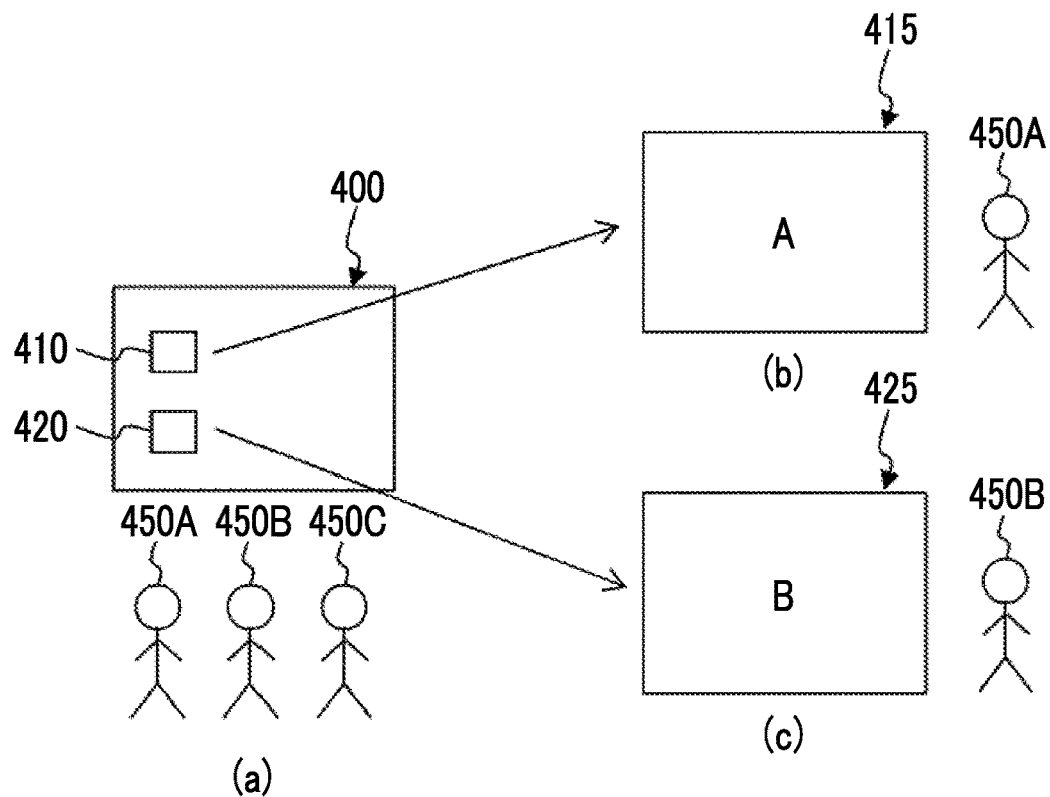
FIG. 4 is a diagram illustrating a processing example according to the first exemplary embodiment.

FIG. 4 is a diagram illustrating a processing example according to the first exemplary embodiment.

There is a team constituted by a user 450A, a user 450B, and a user 450C. That is, work is performed by this team. However, three persons do not necessarily perform the same work at all times, and divided work may occur.

For example, in a case where three persons perform work, the persons perform work such as tag attachment on a shared mount 400. In the divided work, each person (here, the user 450A and the user 450B) performs work such as tag attachment on a mount (here, a working mount 415 and a working mount 425) of each person. It may be necessary to perform additional work by connecting the working mount 415 and the working mount 425 which are results of the work.

Consequently, as illustrated in the example of part (a) of FIG. 4, a tag 410 and a tag 420 are created on the shared mount 400.

As illustrated in the example of part (b) of FIG. 4, the tag 410 and the tag 420 are respectively linked to the working mount 415 and the working mount 420, and persons in charge (the user 450A and the user 450B) are assigned. Here, the tag 410 and the tag 420 are illustrative of "the tag related to the second mount".

Specifically, the user 450A is assigned as a person in charge of the working mount 415, and creates a working list on the working mount 415. The user 450B is assigned as a person in charge of the working mount 425, and creates a working list on the working mount 425.

Meanwhile, an operation of connecting the tag 410 and the tag 420 to each other has not yet been performed on the shared mount 400. Therefore, as illustrated in the example of parts (b) and (c) of FIG. 4, the user 450A and the user 450B individually perform work on the working mount 415 and the working mount 425.

Figure 5:
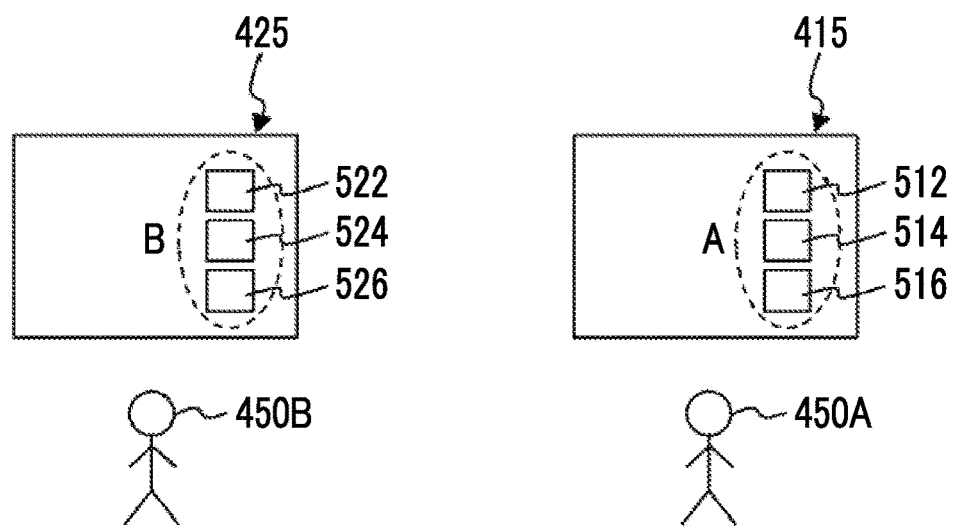
FIG. 5 is a diagram illustrating a processing example according to the first exemplary embodiment.

FIG. 5 is a diagram illustrating a processing example according to the first exemplary embodiment.

The user 450B performs work on the working mount 425, and the user 450A performs work on the working mount 415. As a result, a tag 522, a tag 524, and a tag 526 in a working list are attached onto the working mount 425, and a tag 512, a tag 514, and a tag 516 in a working list are attached onto the working mount 415.

Here, it is assumed that common work is necessary between the user 450A and the user 450B. For example, the user 450B has created the tag 222 in the working list, which was originally taken charge by the user 450A, on the working mount 425. However, the tag 522 on the working mount 425 may be desired to be moved to the working mount 415 in order to give the user 450A charge of the tag 522.

Figure 6:
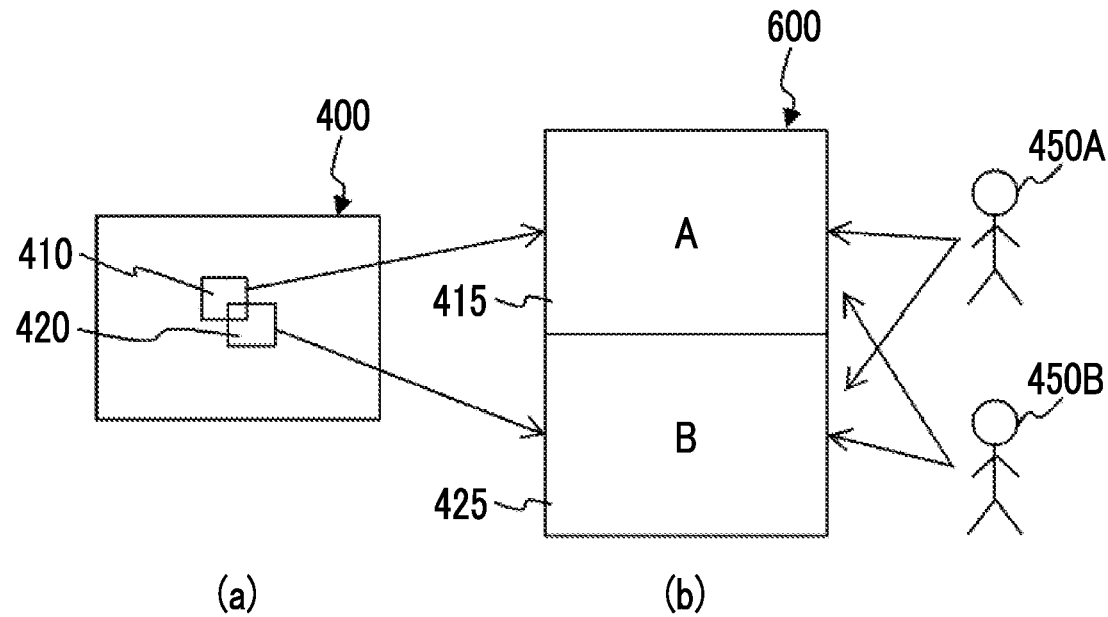
FIG. 6 is a diagram illustrating a processing example according to the first exemplary embodiment.

FIG. 6 is a diagram illustrating a processing example according to the first exemplary embodiment.

Since an operation of moving the tag 522 between the working mount 415 and the working mount 425 is required, an operation of vertically superimposing the tag 410 and the tag 420 is performed on the shared mount 400 as illustrated in the example of part (a) of FIG. 6. Based on the operation, connection is performed by positioning the working mount 415 on the upper side and positioning the working mount 425 on the lower side in accordance with a positional relationship in a case where the tag 410 and the tag 420 are superimposed on each other as illustrated in the example of part (b) of FIG. 6, whereby a connection mount 600 is generated. Thereby, the user 450A is accessible to the working mount 425 other than the working mount 415, and the user 450B is accessible to the working mount 415 other than the working mount 425.

Figure 7:
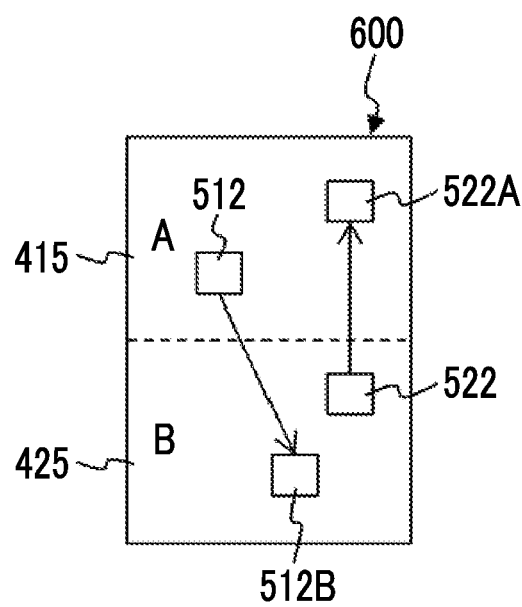
FIG. 7 is a diagram illustrating a processing example according to the first exemplary embodiment.

FIG. 7 is a diagram illustrating a processing example according to the first exemplary embodiment.

Specifically, in the connection mount 600, the tag 512 positioned on the working mount 415 can be moved to the working mount 425 (moved to the position of a tag 512B), and the tag 522 positioned on the working mount 425 can be moved to the working mount 415 425 (moved to the position of a tag 522A). This operation is the same as a movement operation of the single working mount 415 or working mount 425. That is, it is possible to move a tag between mounts by a normal operation.

Meanwhile, in a case where there is an attempt to move a tag to an outside region beyond a mount (in the example of FIG. 7, the connection mount 600) on a screen, the mount may be enlarged in the direction (a direction in which the mount is moved) to secure a movement destination. Meanwhile, such a mount enlargement process may be prohibited in a case of a movement operation (or a copying operation) beyond the connection side between the working mount 415 and the working mount 425 (the boundary between the working mount 415 and the working mount 425). That is, the movement operation is merely a movement operation within the connection mount 600 even in a case where the movement operation is a movement operation beyond the connection side between the working mount 415 and the working mount 425, and the mount enlargement process is not applied to individual mounts after the connection.

Figure 8A:
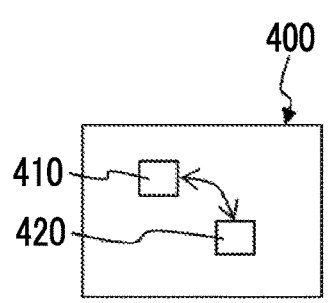
FIGS. 8A to 8C are diagrams illustrating a processing example according to the first exemplary embodiment.
Figure 8B:
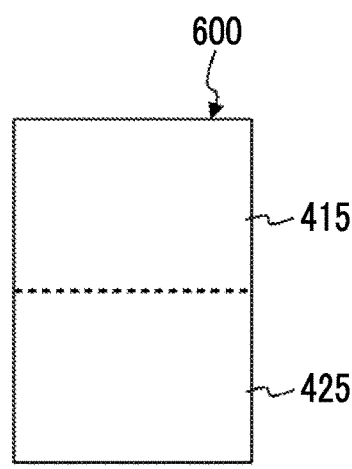
Figure 8C:
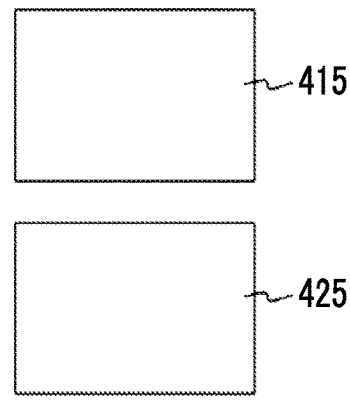

FIGS. 8A to 8C are diagrams illustrating a processing example according to the first exemplary embodiment.

As illustrated in the example of FIG. 8A, a description will be given of processing in a case where an operation of separating the tag 410 and the tag 420 from each other is performed on the shared mount 400.

In a case where work is performed in the connection mount 600, the connection mount 600 is left as it is, as illustrated in the example of FIG. 8B. That is, the working mount 415 and the working mount 425 are left connected to each other. Here, regarding the determination of whether "work is performed in the connection mount 600", it may be detected whether explicit termination of an operation in the connection mount 600 (for example, the termination of display of the connection mount 600, the termination of an operation in the connection mount 600, or the like) has been performed, or it may be detected whether a period for which an operation with respect to the connection mount 600 is not performed is longer or equal to or longer than a predetermined period.

In a case where work is not performed in the connection mount 600, the connection mount 600 may be separated into the original working mount 415 and working mount 425 as illustrated in the example of FIG. 8C. That is, Therefore, the user 450A returns to work in the working mount 415 instead of the connection mount 600, and the user 450B returns to work in the working mount 425 instead of the connection mount 600.

In this manner, in a case where work is performed in the connection mount 600, the work in the connection mount 600 can be continued even in a case where an operation of separating the tag 410 and the tag 420 from each other in the shared mount 400 is performed. Naturally, in a case where work is not performed in the connection mount 600, the operation of separating the tag 410 and the tag 420 from each other in the shared mount 400 is reflected in a case where the operation is performed, and thus individual work is performed in the working mount 415 and the working mount 425.

Figure 9:
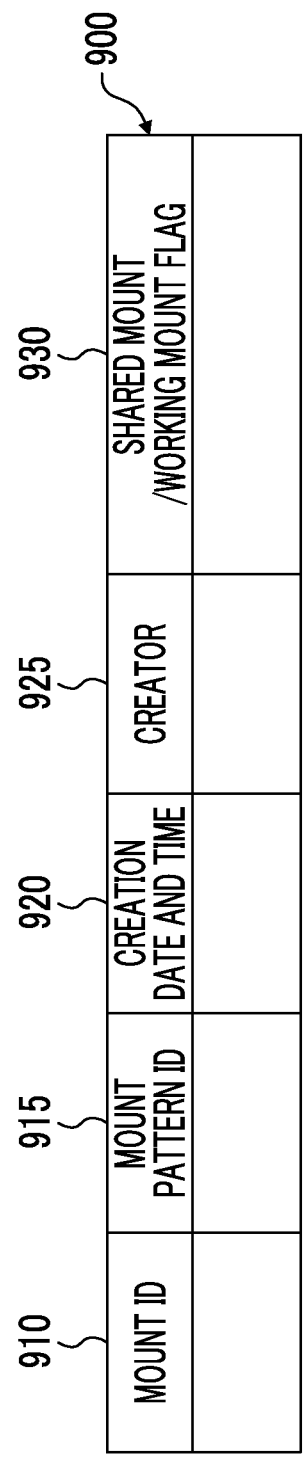
FIG. 9 is a diagram illustrating an example of a data structure of a mount information table.

FIG. 9 is a diagram illustrating an example of a data structure of a mount information table 900. The mount information table 900 is stored in the mount information storage module 105. The mount information table 900 includes a mount ID column 910, a mount pattern ID column 915, a creation date and time column 920, a creator column 925, and a shared mount/working mount flag column 930. The mount ID column 910 stores information (mount ID) for uniquely identifying a mount in this exemplary embodiment. The mount pattern ID column 915 serving as a background stores a mount pattern ID. Examples of the mount pattern include a pattern of blank paper, a pattern in a table format, and the like. Further, the mount pattern may be, for example, a mount pattern for task management. Specifically, a region for drawing an icon of a portrait of an assembly participant (may be a person serving as a person in charge of a task) is determined in advance, and the icon may be drawn at a point in time determined by the participant in the assembly. In addition, a self-introduction tag of the assembly participant may be replaced with the icon. Further, as a mount for a manager, a schedule table may be prepared in which the horizontal axis is represented by a date and time and each person in charge is assigned to the vertical axis. It is possible to intuitively collectively ascertain the schedule and the persons in charge on the mount by the schedule table mount. In the schedule table mount, the manager can set the degree of priority of a task of a person in charge. The creation date and time column 920 stores a creation date and time of the mount. The creator column 925 stores the creator of the mount. The shared mount/working mount flag column 930 stores information (flag) indicating whether being a shared mount (first mount) or a working mount (second mount).

FIG. 10 is a diagram illustrating an example of a data structure of a tag information table 1000. The tag information table 1000 is stored in the tag property information storage module 115. The tag information table 1000 includes a tag ID column 1010, a mount ID column 1012, an attachment position column 1015, a size column 1020, a creation date and time column 1025, a creator column 1030, an attachment date and time column 1035, a color column 1040, a frame line shape column 1045, a frame line color column 1050, a frame line thickness column 1055, a belonging group column 1060, a mount link flag column 1065, a link destination mount ID column 1070, a content type column 1075, and a content column 1080. The tag ID column 1010 stores information (tag ID) for uniquely identifying a tag in this exemplary embodiment. The mount ID column 1012 stores a mount ID. The attachment position column 1015 stores an attachment position of the tag (for example, the center, the upper left end, or the like of the tag). That is, the attachment position column stores an attachment position on the mount. For example, the attachment position is coordinates of the mount in an XY coordinate system. The size column 1020 stores the size of the tag. For example, in a case where the tag to be displayed has a rectangular shape, the size column stores the width and height of the tag. The creation date and time column 1025 stores a date and time (may be year, month, day, hour, minute, second, a time unit smaller than second, or a combination thereof) when the tag is created. The creator column 1030 stores the creator (creator ID) of the tag. Alternatively, the creator column may store an information processing apparatus (a device ID of the electronic tag terminal 250 or the electronic tag control apparatus 100) by which the tag is created. The attachment date and time column 1035 stores a date and time when the tag is attached to a mount. The color column 1040 stores the display color of the tag. The frame line shape column 1045 stores the shape (a solid line, a dotted line, a dashed line, a wavy line, a double line, or the like) of a frame line in the display of the tag. The frame line color column 1050 stores the color of the frame line in the display of the tag. The frame line thickness column 1055 stores the thickness of the frame line in the display of the tag. The belonging group column 1060 stores information on a group to which the tag belongs. For example, information indicating whether or not the tag belongs to a group may be stored, or a group ID in a case where the tag belongs to a group, another tag ID belonging to the group, and the like may be stored. The mount link flag column 1065 stores information (flag) indicating whether or not a mount link corresponding to the tag is present. For example, the mount link flag column stores any one of ON (a flag state indicating that a mount link corresponding to the tag is present) or OFF (a flag state indicating that a mount does not correspond to the tag, that is, a flag state indicating being a general tag). The link destination mount ID column 1070 stores a mount ID of a link destination. Naturally, in a case where OFF is stored in the mount link flag column 1065, the link destination mount ID column 1070 is empty (null). The content type column 1075 stores the type of contents of the tag (text information, vector data indicating handwritten characters, a figure, and the like, sound information, still image information such as a photograph, movie information, or information indicating a combination thereof). The content column 1080 stores contents written in the tag.

Figure 11:
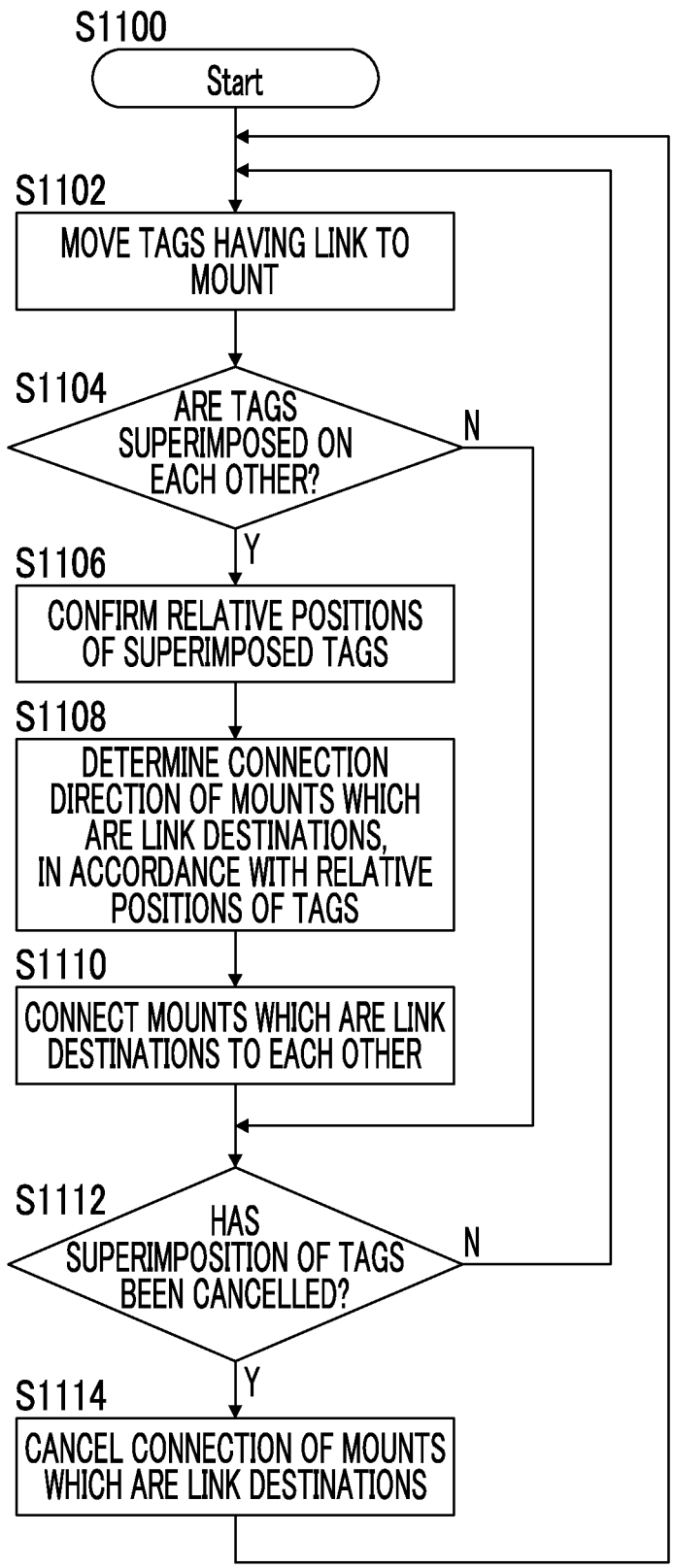
FIG. 11 is a flowchart illustrating a processing example according to the first exemplary embodiment.

FIG. 11 is a flowchart illustrating a processing example according to the first exemplary embodiment. The flowchart shows an example in which a mount connection process is performed by an operation of "superimposing tags on each other".

In step S1102, tags having a link to a mount are moved in accordance with an operator's operation.

In step S1104, it is determined whether or not tags are superimposed on each other. In a case where the tags are superimposed on each other, the processing proceeds to step S1106. Otherwise, the processing proceeds to step S1112.

In step S1106, relative positions of the superimposed tags are confirmed.

Figure 12A:
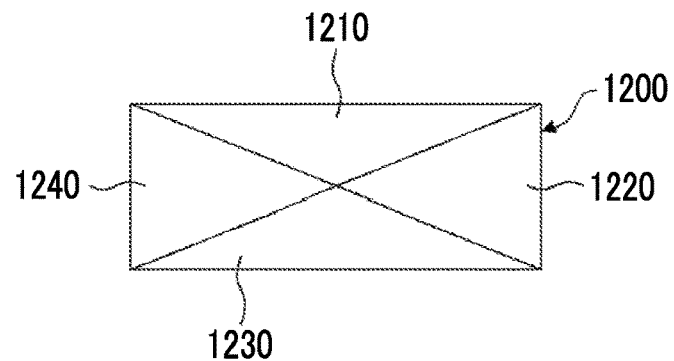
FIGS. 12A to 12C are diagrams illustrating a processing example according to the first exemplary embodiment.
Figure 12B:
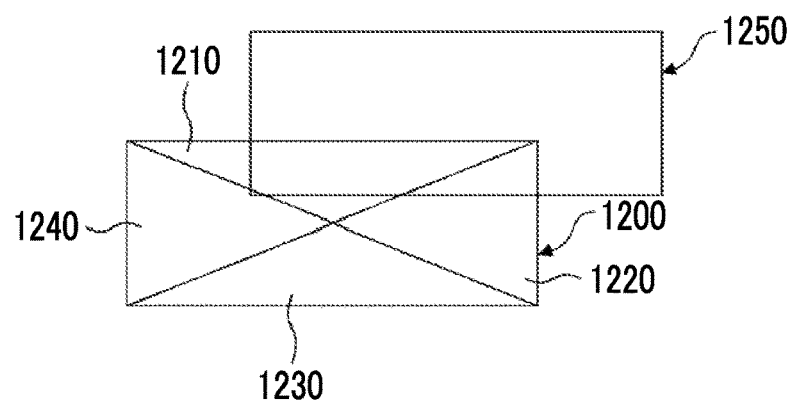
Figure 12C:
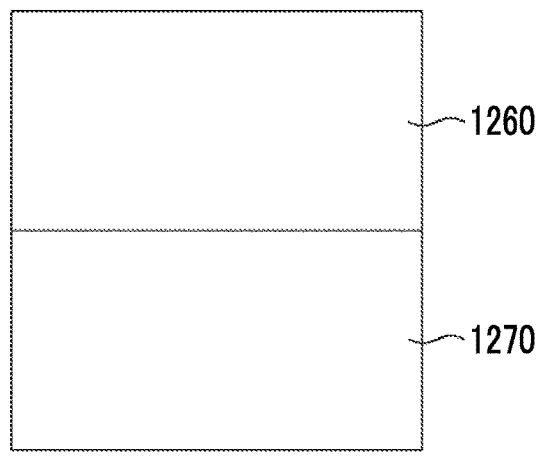

FIGS. 12A to 12C are diagrams illustrating a processing example according to the first exemplary embodiment. A tag 1200 has a link to a mount 1270, and a tag 1250 has a link to a mount 1260.

As illustrated in the example of FIG. 12A, the tag 1200 is divided into four regions of a superimposition determination region 1210, a superimposition determination region 1220, a superimposition determination region 1230, and a superimposition determination region 1240.

As illustrated in the example of FIG. 12B, in a case where the tag 1200 and the tag 1250 are superimposed on each other, the proportion of a superimposed area to each region (the superimposition determination region 1210, the superimposition determination region 1220, the superimposition determination region 1230, and the superimposition determination region 1240) is calculated, and a connection side between the mount 1260 and the mount 1270 is determined in accordance with the region having the highest proportion.

In step S1108, a connection direction of mounts which are link destinations is determined in accordance with the relative positions of the tags.

In a case of the example of FIG. 12B, the proportion of an area occupied by the superimposition determination region 1210 is higher than the proportion of an area of the superimposition determination region 1220 in the superimposed region of the tag 1200 and the tag 1250, and thus connection is performed by positioning the mount 1260 which is a link destination of the tag 1250 on the upper side and positioning the mount 1270 which is a link destination of the tag 1200 on the lower side as illustrated in the example of FIG. 12C.

In step S1110, the mounts which are link destinations are connected to each other.

In step S1112, it is determined whether or not the superimposition of the tags has been cancelled. In a case where the superimposition of the tags has been cancelled, the processing proceeds to step S1114. Otherwise, the processing returns to step S1102.

In step S1114, the connection of the mounts which are link destinations is cancelled, and the processing returns to step S1102. Meanwhile, in this case, the connection is not cancelled in a case where work is still in progress in the connected mounts, and the connection is cancelled after it is waited until the work in the connected mounts is terminated.

Figure 13:
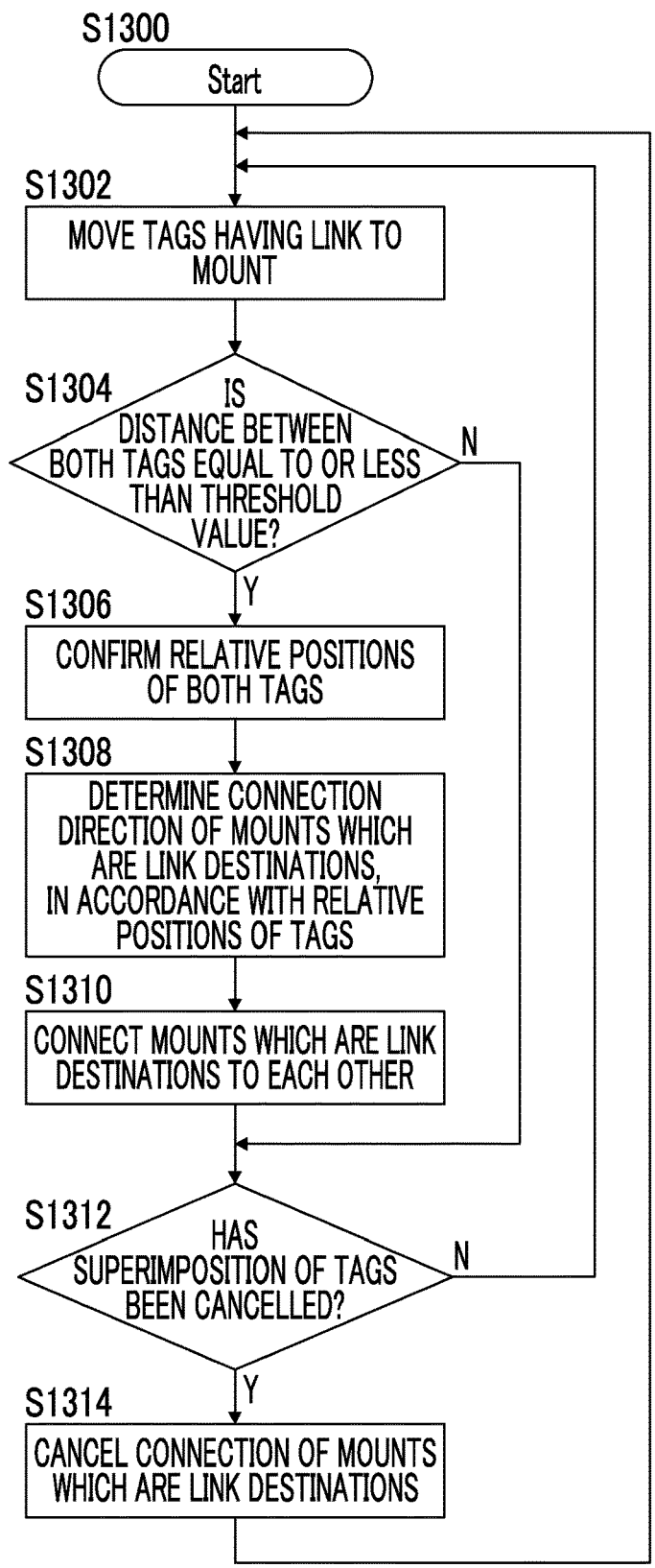
FIG. 13 is a flowchart illustrating a processing example according to the first exemplary embodiment.

FIG. 13 is a flowchart illustrating a processing example according to the first exemplary embodiment. The flowchart shows an example in which a mount connection process is performed by an operation of "bringing tags close to each other within a predetermined distance".

In step S1302, tags having a link to a mount are moved in accordance with an operator's operation.

In step S1304, it is determined whether or not a distance between both the tags is equal to or less than a threshold value. In a case where the distance is equal to or less than the threshold value, the processing proceeds to step S1306. Otherwise, the processing proceeds to step S1312.

In step S1306, relative positions of both the tags are confirmed.

Figure 14A:
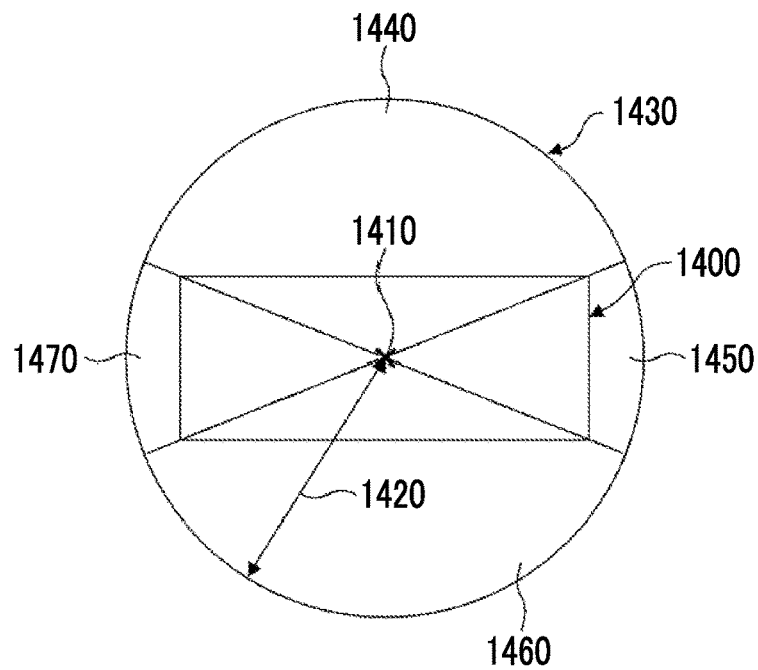
FIGS. 14A to 14C are diagrams illustrating a processing example according to the first exemplary embodiment.
Figure 14B:
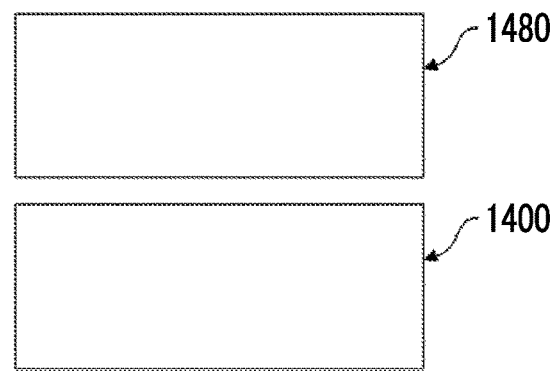
Figure 14C:
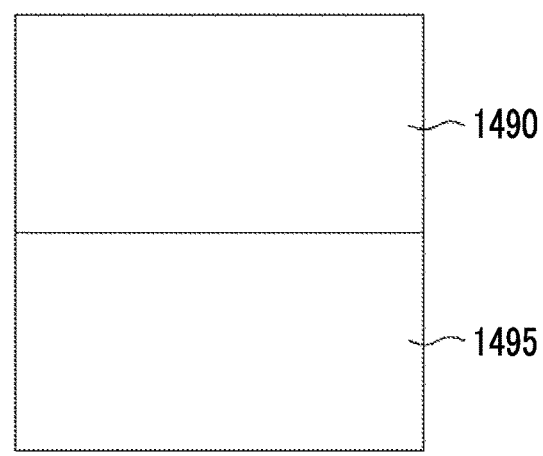

FIGS. 14A to 14C are diagrams illustrating a processing example according to the first exemplary embodiment. A tag 1400 has a link to a mount 1495, and a tag 1480 has a link to a mount 1490.

As illustrated in the example of FIG. 14A, a region 1430 which is a circle having a radius (distance 1420) from the center 1410 of the tag 1400 is generated, and is divided into four regions of a relative position determination region 1440, a relative position determination region 1450, a relative position determination region 1460, and a relative position determination region 1470. That is, the region 1430 is divided into regions generated by drawing a straight line to four corners of the tag 1400 from the center 1410.

As illustrated in the example of FIG. 14B, in a case where a distance between the tag 1400 and a tag 1480 is less than the distance 1420, the proportion of a superimposed area between the circle illustrated in the example of FIG. 14A and the tag 1480 to each region (the relative position determination region 1440, the relative position determination region 1450, the relative position determination region 1460, and the relative position determination region 1470) is calculated, and a connection side between the mount 1490 and the mount 1495 is determined in accordance with the region having the highest proportion.

In step S1308, a connection direction of mounts which are link destinations is determined in accordance with the relative positions of the tags.

In a case of the example of FIG. 14B, a region having the maximum proportion which is occupied by the tag 1480 in the region 1430 is the relative position determination region 1440, and thus connection is performed by positioning the mount 1490 which is a link destination of the tag 1480 on the upper side and positioning the mount 1495 which is a link destination of the tag 1400 on the lower side.

In step S1310, the mounts which are link destinations are connected to each other.

In step S1312, it is determined whether or not the superimposition of the tags has been cancelled. In a case where the superimposition of the tags has been cancelled, the processing proceeds to step S1314. Otherwise, the processing returns to step S1302.

In step S1314, the connection of the mounts which are link destinations is cancelled, and the processing returns to step S1302. Meanwhile, in this case, the connection is not cancelled in a case where work is still in progress in the connected mounts, and the connection is cancelled after it is waited until the work in the connected mounts is terminated.

Figure 15:
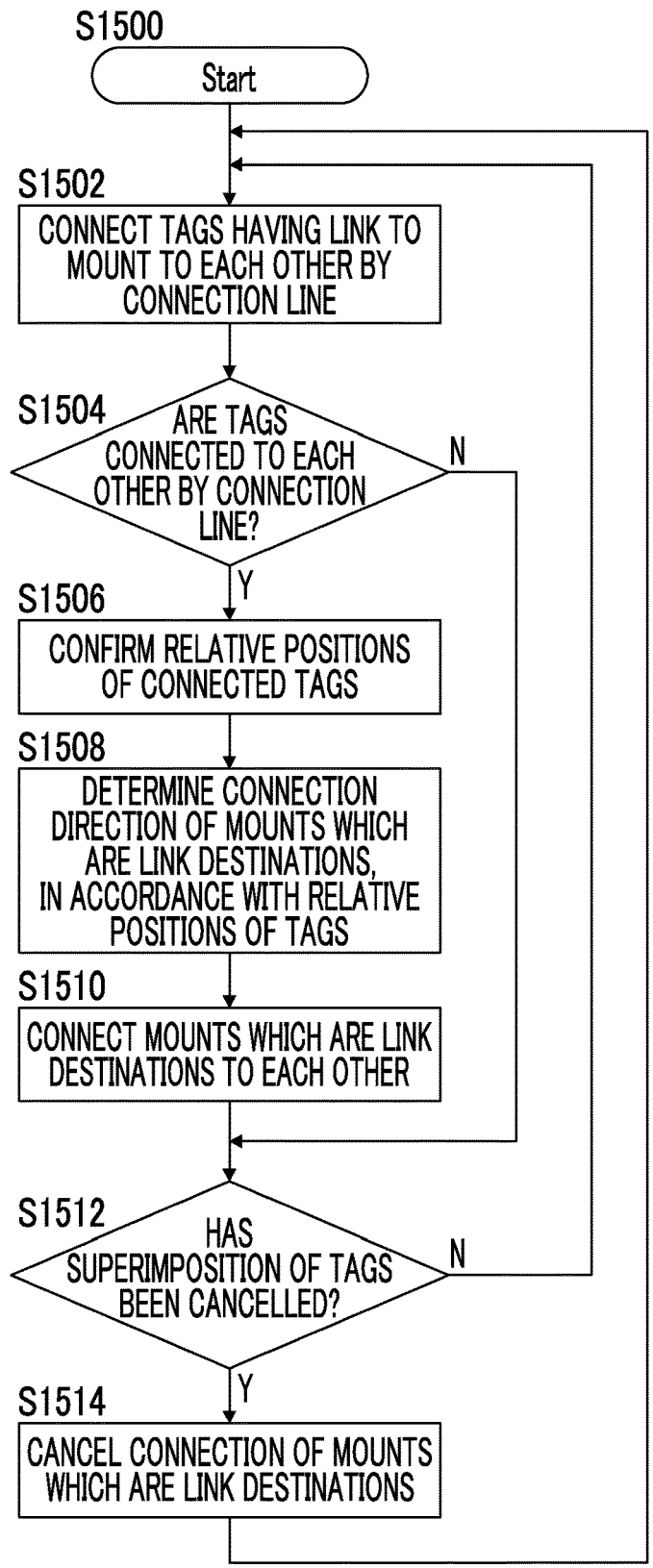
FIG. 15 is a flowchart illustrating a processing example according to the first exemplary embodiment.

FIG. 15 is a flowchart illustrating a processing example according to the first exemplary embodiment. The flowchart shows an example in which a mount connection process is performed by an operation of "connecting both tags by using a line indicating connection".

In step S1502, tags having a link to amount are connected to each other by a connection line in accordance with an operator's operation.

In step S1504, it is determined whether or not the tags are connected to each other by the connection line. In a case where the tags are connected to each other by the connection line, the processing proceeds to step S1506. Otherwise, the processing proceeds to step S1512.

In step S1506, relative positions of the connected tags are confirmed.

In step S1508, a connection direction of mounts which are link destinations is determined in accordance with the relative positions of the tags.

In step S1510, the mounts which are link destinations are connected to each other.

In step S1512, it is determined whether or not the superimposition of the tags has been cancelled. In a case where the superimposition of the tags has been cancelled, the processing proceeds to step S1514. Otherwise, the processing returns to step S1502.

In step S1514, the connection of the mounts which are link destinations is cancelled, and the processing returns to step S1502. Meanwhile, in this case, the connection is not cancelled in a case where work is still in progress in the connected mounts, and the connection is cancelled after it is waited until the work in the connected mounts is terminated.

FIGS. 16A1 to 16D2 are diagrams illustrating a processing example (the flowchart illustrated in the example of FIG. 15) according to the first exemplary embodiment.

As illustrated in the examples of FIGS. 16A1 and 16A2, a lower side of a tag 1610a and an upper side of a tag 1620a are connected to each other by a connection line 1630a, and thus connection is performed by positioning a mount 1640a which is a link destination of the tag 1610a on the upper side and positioning a mount 1650a which is a link destination of the tag 1620a on the lower side.

As illustrated in the examples of FIGS. 16B1 and 16B2, a right side of a tag 1610b and a left side of a tag 1620b are connected to each other by a connection line 1630b, and thus connection is performed by positioning a mount 1640b which is a link destination of the tag 1610b on the left side and positioning a mount 1650b which is a link destination of a tag 1620b on the right side.

As illustrated in the examples of FIGS. 16C1 and 16C2, an upper side of a tag 1610c and a lower side of a tag 1620c are connected to each other by a connection line 1630c, and thus connection is performed by positioning amount 1650c which is a link destination of the tag 1620c on the upper side and positioning a mount 1640c which is a link destination of the tag 1610c on the lower side.

As illustrated in the examples of FIGS. 16D1 and 16D2, a left side of a tag 1610d and a right side of a tag 1620d are connected to each other by a connection line 1630d, and thus connection is performed by positioning a mount 1650d which is a link destination of the tag 1620d on the upper side and positioning a mount 1640d which is a link destination of the tag 1610d on the lower side.

Second Exemplary Embodiment

Figure 17:
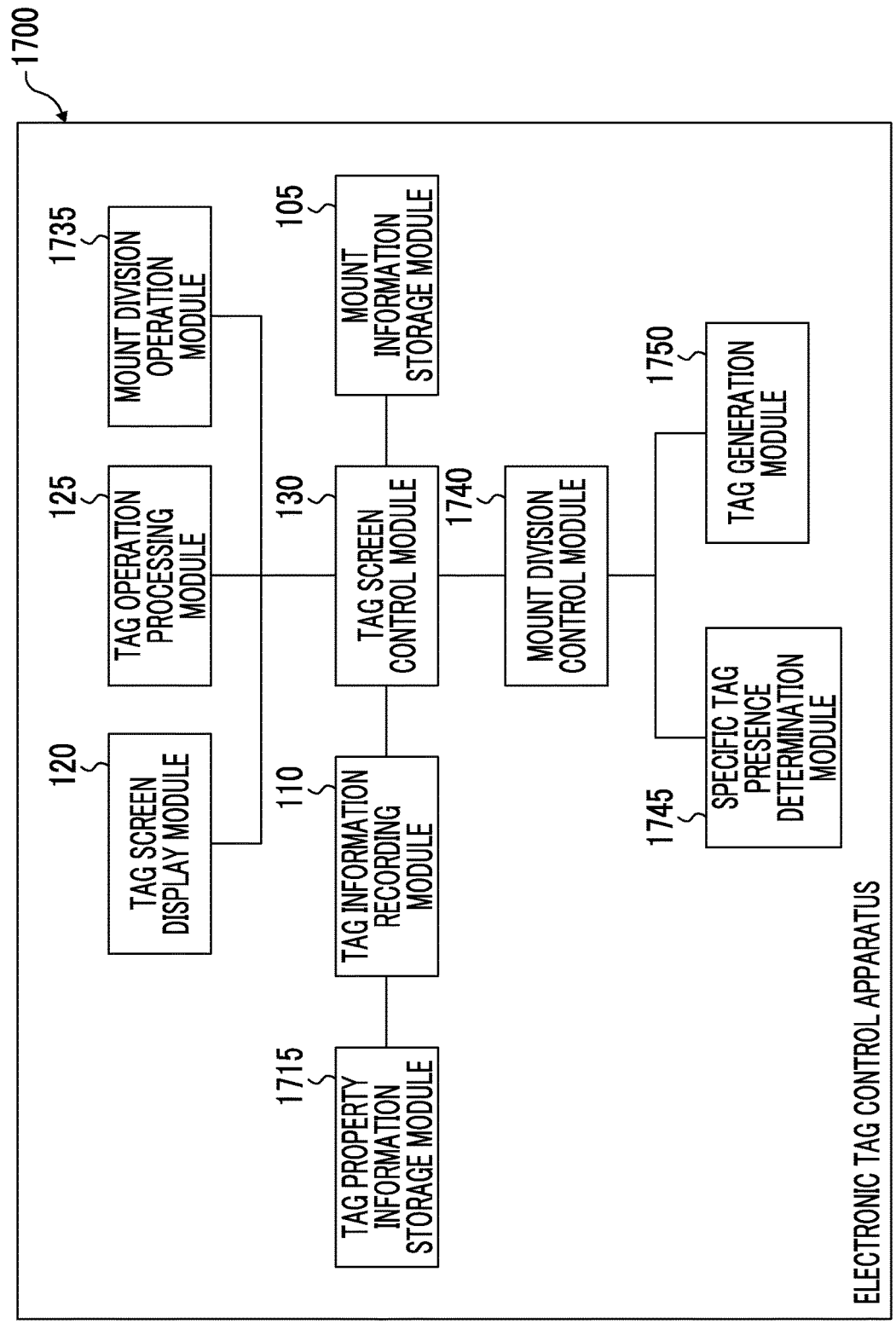
FIG. 17 is a conceptual module configuration diagram illustrating a configuration example according to a second exemplary embodiment.

FIG. 17 is a conceptual module configuration diagram illustrating a configuration example according to a second exemplary embodiment.

An electronic tag control apparatus 1700 (an example of an information processing apparatus) which is the second exemplary embodiment performs processing related to a mount and a tag (also referred to as an electronic tag, an electronic card, or the like) which are used at an assembly, and includes a mount information storage module 105, a tag information recording module 110, a tag property information storage module 1715, a tag screen display module 120, a tag operation processing module 125, amount division operation module 1735, a tag screen control module 130, amount division control module 1740, a specific tag presence determination module 1745, and a tag generation module 1750 as illustrated in the example of FIG. 17. Meanwhile, the same type of portions as those in the first exemplary embodiment are denoted by the same reference numerals and signs, and a repeated description will be omitted. In addition, division includes the separation of mounts connected by the electronic tag control apparatus 100 according to the first exemplary embodiment.

The mount information storage module 105 is connected to the tag screen control module 130.

The tag information recording module 110 is connected to the tag property information storage module 1715 and the tag screen control module 130. The tag information recording module stores information (for example, property information and the like) on a tag in the tag property information storage module 1715 under the control of the tag screen control module 130.

The tag property information storage module 1715 is connected to the tag information recording module 110. The tag property information storage module 1715 stores property information of each tag under the control of the tag information recording module 110. Examples of the property information to be stored include a mount ID of a mount to which the tag is attached, an attachment position of the tag in the mount, the size of the tag, a flag indicating a specific tag, and the like. Specifically, the tag property information storage module stores a tag information table 2300 illustrated in an example of FIG. 23 to be described later. In addition, the tag property information storage module may store a list of tags attached to the mount. Specifically, the tag property information storage module may store a list of tag IDs, and the like for each mount.

The tag screen display module 120 is connected to the tag screen control module 130.

The tag operation processing module 125 is connected to the tag screen control module 130.

The mount division operation module 1735 is connected to the tag screen control module 130. The mount division operation module 1735 receives an operation with respect to a tag or a mount by the facilitator or the like, and causes the mount division control module 1740 to perform processing based on the operation.

The tag screen control module 130 is connected to the mount information storage module 105, the tag information recording module 110, the tag screen display module 120, the tag operation processing module 125, the mount division operation module 1735, and the mount division control module 1740.

The mount division control module 1740 is connected to the tag screen control module 130, the specific tag presence determination module 1745, and the tag generation module 1750. The mount division control module 1740 divides a first mount into plural second mounts. The first mount is a mount which is a target for division, and is a mount before the division. The second mounts are mounts after the division, and the number of second mounts is two or more. Meanwhile, even after the first mount is divided, the first mount is left as it is, and the first mount and the plural second mounts are present. That is, new mounts (plural second mounts) are generated.

In addition, the mount division control module 1740 may control the specific tag presence determination module 1745 and the tag generation module 1750 to generate a tag on the second mount, in a case where the tag is present at a position on the first mount which corresponds to the second mount. Here, the tag which is present on the first mount is a tag related to the second mount. The "tag related to the second mount" refers to the correspondence of the tag and the second mount (it may be said that the tag is represented by or replaced with the second mount) as described in the first exemplary embodiment, and means that the second mount is designated in a case where the tag is designated on the first mount. Specifically, the correspondence can be realized by attaching a link to the second mount onto the tag.

That is, it is indicated that the tag, which was originally positioned on the first mount, serves as a tag related to the second mount.

In addition, the mount division control module 1740 may generate a tag related to the second mount at a position in the first mount in a case where a tag is not present at the position on the first mount which corresponds to the second mount. That is, it is indicated that a tag related to the second mount is generated on the first mount in a case where a region where a tag is not positioned on the first mount is divided.

Further, the mount division control module 1740 may generate a tag corresponding to the tag, which is generated on the first mount, on the second mount.

The specific tag presence determination module 1745 is connected to the mount division control module 1740. In a case where the first mount is divided, the specific tag presence determination module 1745 determines whether or not a tag is present in a region of the divided first mount. In a case where a tag is present, the tag is set to be a tag related to the second mount corresponding to the region. In a case where a tag is not present, control is performed so that the tag generation module 1750 generates a tag.

The tag generation module 1750 is connected to the mount division control module 1740. In a case where the specific tag presence determination module 1745 determines that a tag is not present in the region of the divided first mount, the tag generation module 1750 generates a tag related to the second mount on the first mount. In contrast, a tag corresponding to the generated tag is generated on the second mount.

Figure 18:
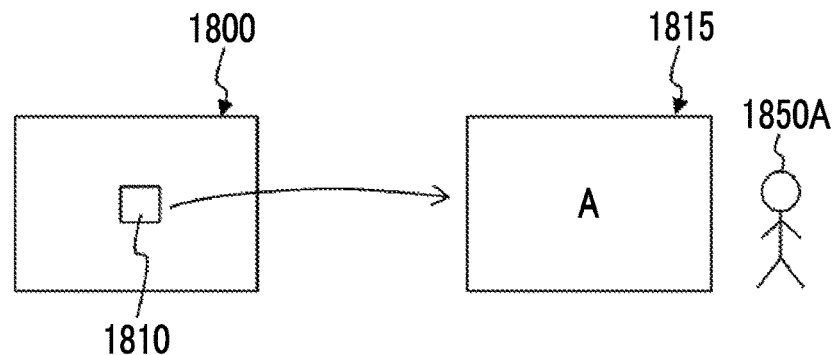
FIG. 18 is a diagram illustrating a processing example according to the second exemplary embodiment.

FIG. 18 is a diagram illustrating a processing example according to the second exemplary embodiment.

Similarly to the first exemplary embodiment, a tag 1810 is created on a shared mount 1800, and is given a link to a working mount 1815 used by a user 1850A. Thereby, in a case where the tag 1810 is selected to perform an opening operation (for example, a double-click, a double-tap, or the like), the working mount 1815 is displayed.

Figure 19:
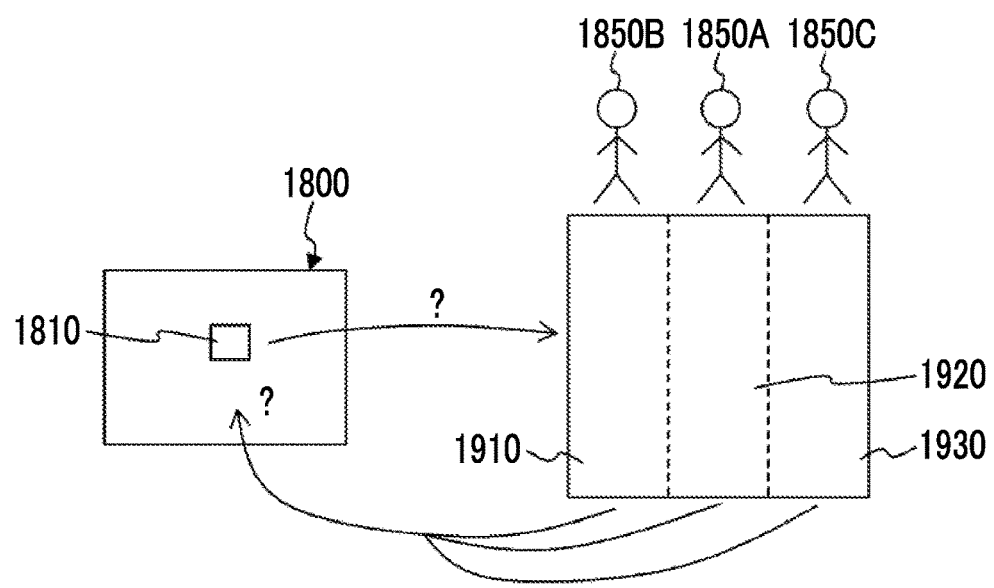
FIG. 19 is a diagram illustrating a processing example according to the second exemplary embodiment.

FIG. 19 is a diagram illustrating a processing example according to the second exemplary embodiment.

Here, in a case where the shared mount 1800 is divided into three mounts (a mount 1910, amount 1920, and amount 1930) in order to perform work by three persons (a user 1850A, a user 1850B, and a user 1850C), it is necessary to perform a process of determining to which mount the tag 1810 originally positioned on the shared mount 1800 is attached. Further, it is necessary to generate a tag related to each of the three mounts, on the shared mount 1800.

Meanwhile, as the division operation, division into a predetermined number of regions (for example, a mount 1910, a mount 1920, and a mount 1930) may be performed in a case where a division button displayed on the shared mount 1800 is selected, and division into the regions may be performed in a case where a boundary line for division into the regions on the shared mount 1800 is drawn.

Figure 20:
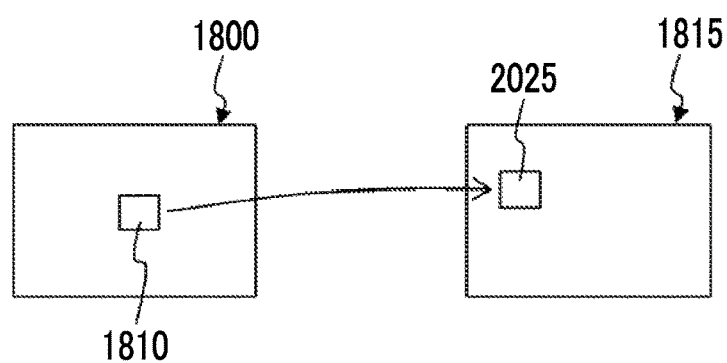
FIG. 20 is a diagram illustrating a processing example according to the second exemplary embodiment.

FIG. 20 is a diagram illustrating a processing example according to the second exemplary embodiment.

In the second exemplary embodiment, the tag 1810 within the shared mount 1800 is given a link to the working mount 1815 (may include a tag attached to the working mount 1815), and a specific tag 2025 which is given a link to the tag 1810 within the shared mount 1800 is generated in the working mount 1815. The tag 1810 may be a tag which has already been attached to the shared mount 1800, or may be a tag which is newly generated in a case where the working mount 1815 is generated.

Figure 21:
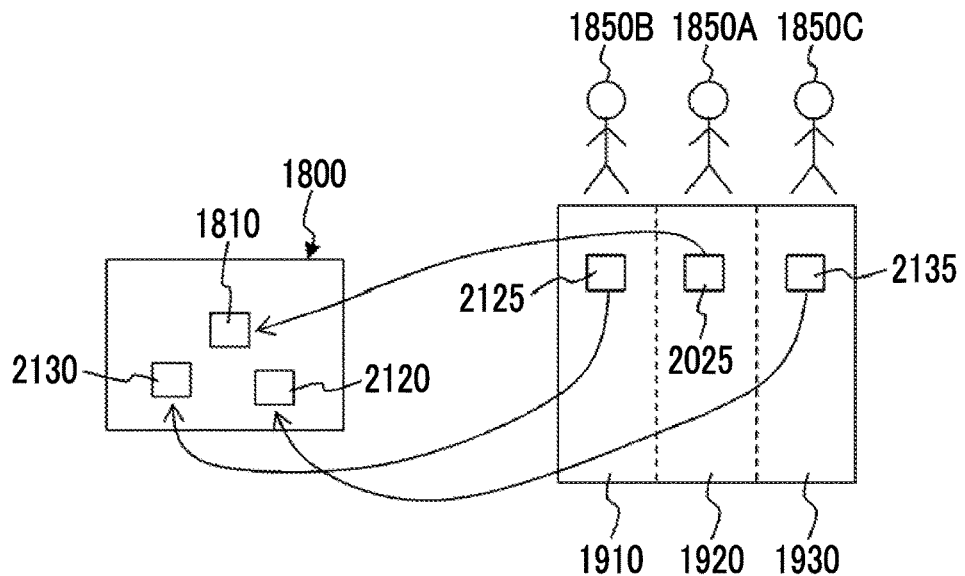
FIG. 21 is a diagram illustrating a processing example according to the second exemplary embodiment.

FIG. 21 is a diagram illustrating a processing example according to the second exemplary embodiment.

The tag 1810 and the specific tag 2025 illustrated in the example of FIG. 20 are applied to the division of a mount.

Here, the tag 1810 is a tag which is attached to the shared mount 1800 before division, and a tag 2120 and a tag 2130 are tags which are generated after the shared mount 1800 is divided. The tag 1810 is positioned within a region corresponding to the mount 1920 obtained by dividing the shared mount 1800, and thus the tag 1810 has a link to the mount 1920. The tag 2120 has a link to the mount 1930 and is disposed at a position (a position on a side closer to the right side than the tag 1810) in the region of the mount 1930, and the tag 2130 has a link to the mount 1910 and is disposed at a position (a position on a side closer to the left side than the tag 1810) in the region of the mount 1910.

The mount 1910 obtained by division generates a specific tag 2125, and the specific tag 2125 has a link to the tag 2130. The specific tag 2025 is generated in the mount 1920 obtained by division, and the specific tag 2025 has a link to the tag 1810. A specific tag 2135 is generated in the mount 1930 obtained by division, and the specific tag 2135 has a link to the tag 2120.

Meanwhile, the tag 1810, the tag 2120, and the tag 2130 may have a role as a title tag (it may be said that the tag is represented by or replaced with the division mounts) of each of the mount 1920, the mount 1930, and the mount 1910. That is, the name of the division mount may be written in the tag 1810 or the like. In contrast, a character string written in the tag 1810 or the like may be set to be a mount name of the mount 1920 or the like.

The tag 1810, the tag 2120, and the tag 2130 have a data structure of the tag information table 1000 illustrated in the example of FIG. 10.

Figure 23:
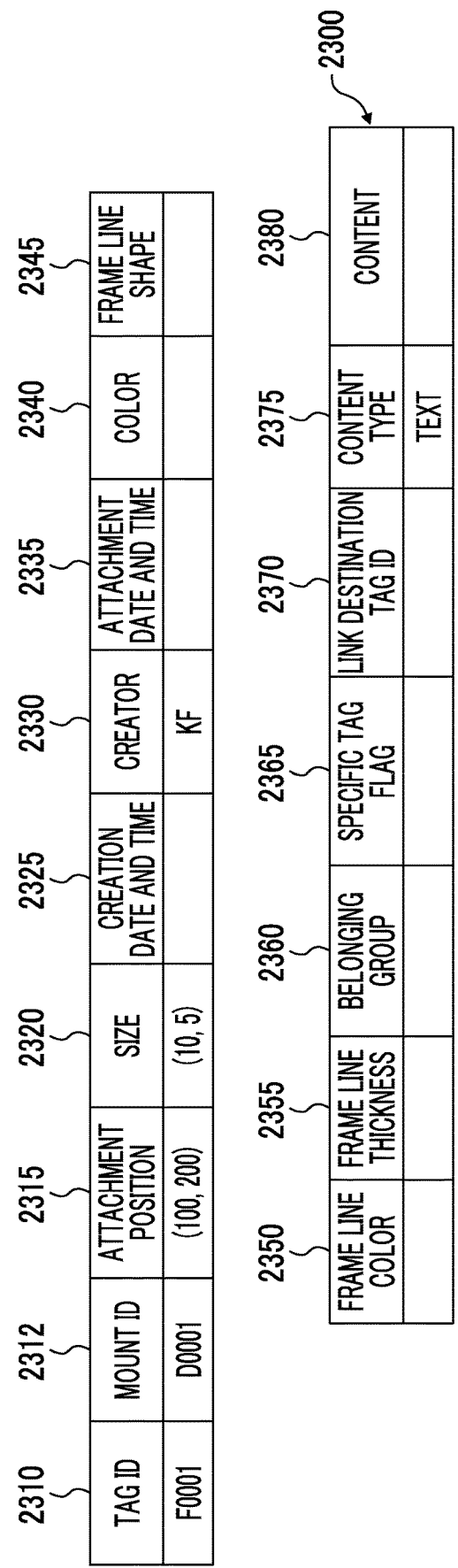
FIG. 23 is a diagram illustrating an example of a data structure of a tag information table.

The specific tag 2025, the specific tag 2125, and the specific tag 2135 have a data structure of the tag information table 2300 illustrated in the example of FIG. 23.

That is, the tag 1810, the tag 2120, and the tag 2130 respectively indicate mounts obtained by division by a link destination mount ID, similar to the first exemplary embodiment. The specific tag 2025, the specific tag 2125, and the specific tag 2135 respectively indicate tags positioned on the mount before division. Thereby, a relationship between the mounts can be represented by tags on the mutual mounts.

Alternatively, the tag 1810, the tag 2120, and the tag 2130 may have a data structure of the tag information table 2300 illustrated in the example of FIG. 23. That is, each of a pair of the tag 1810 and the specific tag 2025, a pair of the tag 2120 and the specific tag 2125, and a pair of the tag 2130 and the specific tag 2135 has a relationship in which the mutual tags are set to be link destination tags. Naturally, it is determined to which mount the tag is attached, on the basis of the mount ID column 1012 of the tag information table 1000 and a mount ID column 2312 of the tag information table 2300, and thus the mutual tags can be referred to as tags related to the mutual mounts. Specifically, it can be said that the tag 1810 is related to the mount 1920 and the specific tag 2025 is related to the shared mount 1800.

It is determined which mount is a shared mount (a mount before division) or a working mount (a mount after division), on the basis of the mount information table 900 (particularly, the shared mount/working mount flag column 930) illustrated in the example of FIG. 9.

Figure 22:
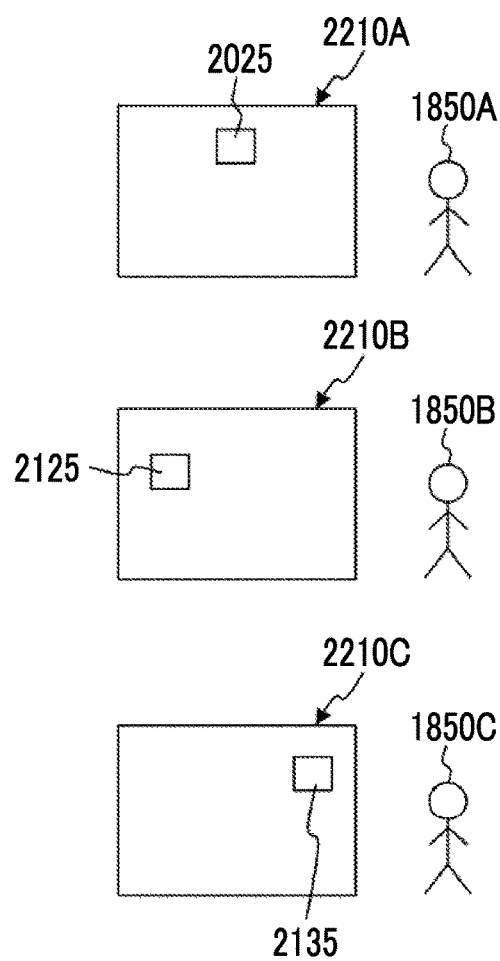
FIG. 22 is a diagram illustrating a processing example according to the second exemplary embodiment.

FIG. 22 is a diagram illustrating a processing example according to the second exemplary embodiment.

A mount 2210A corresponds to the mount 1920, a mount 2210B corresponds to the mount 1910, and a mount 2210C corresponds to the mount 1930. That is, the mount 2210A having a standard size is displayed in the electronic tag terminal 250A with respect to the user 1850A, the mount 2210B having a standard size is displayed in the electronic tag terminal 250B with respect to the user 1850B, and the mount 2210C having a standard size is displayed in the electronic tag terminal 250C with respect to the user 1850C.

Meanwhile, the positions of the specific tag 2025, the specific tag 2125, and the specific tag 2135 within the respective mounts respectively correspond to the positions of the tag 1810, the tag 2130, and the tag 2120 within the shared mount 1800.

FIG. 23 is a diagram illustrating an example of a data structure of the tag information table 2300. The tag information table 2300 is stored in the tag property information storage module 1715. The tag information table 2300 includes a tag ID column 2310, a mount ID column 2312, an attachment position column 2315, a size column 2320, a creation date and time column 2325, a creator column 2330, an attachment date and time column 2335, a color column 2340, a frame line shape column 2345, a frame line color column 2350, a frame line thickness column 2355, a belonging group column 2360, a specific tag flag column 2365, a link destination tag ID column 2370, a content type column 2375, and a content column 2380. The tag ID column 2310 stores a tag ID. The mount ID column 2312 stores amount ID. The attachment position column 2315 stores an attachment position of the tag. That is, the attachment position column stores an attachment position on a mount. For example, the attachment position is coordinates in an XY coordinate system of the mount. The size column 2320 stores the size of the tag. For example, in a case where a tag to be displayed has a rectangular shape, the size column stores the size and height of the tag. The creation date and time column 2325 stores a date and time when the tag is created. The creator column 2330 stores the creator (creator ID) of the tag. Alternatively, the creator column may store an information processing apparatus (a device ID of the electronic tag terminal 250 or the electronic tag control apparatus 100) by which the tag is created. The attachment date and time column 2335 stores a date and time when the tag is attached to the mount. The color column 2340 stores the display color of the tag. The frame line shape column 2345 stores the shape (a solid line, a dotted line, a dashed line, a wavy line, a double line, or the like) of a frame line in the display of the tag. The frame line color column 2350 stores the color of the frame line in the display of the tag. The frame line thickness column 2355 stores the thickness of the frame line in the display of the tag. The belonging group column 2360 stores information on a group to which the tag belongs. For example, information indicating whether or not the tag belongs to a group may be stored, or a group ID in a case where the tag belongs to a group, another tag ID belonging to the group, and the like may be stored. The specific tag flag column 2365 stores information (flag) indicating whether the tag is a specific tag. For example, the specific tag flag column stores any one of ON (a flag state indicating that the tag is a specific tag) or OFF (a flag state indicating that the tag is not a specific tag, that is, a flag state indicating that the tag is a general tag). The link destination tag ID column 2370 stores a tag ID (that is, a tag ID of a tag attached to a mount which is a division source) which is a link destination. The content type column 2375 stores the type of contents of the tag (text information, vector data indicating handwritten characters, a figure, and the like, sound information, still image information such as a photograph, movie information, or information indicating a combination thereof). The content column 2380 stores contents written in the tag.

Figure 24:
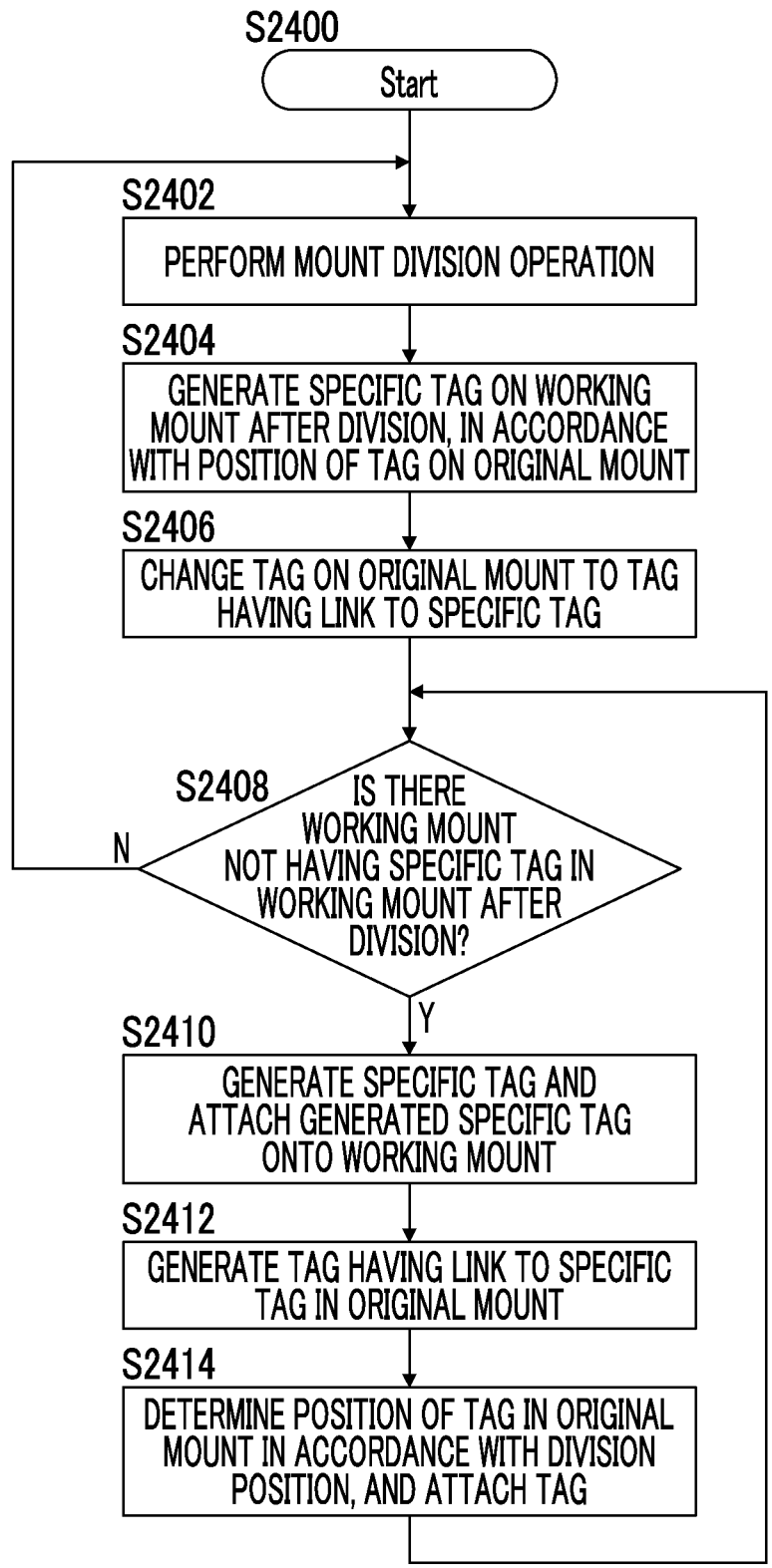
FIG. 24 is a flowchart illustrating a processing example according to the second exemplary embodiment.

FIG. 24 is a flowchart illustrating a processing example according to the second exemplary embodiment.

In step S2402, a mount division operation is received by an operator's operation.

In step S2404, a specific tag is generated on a working mount after division, in accordance with the position of a tag on the original mount. This is a process of generating a tag having a link to a tag which has already been attached onto the original mount, to thereby attach the generated tag onto the working mount after division. Meanwhile, the working mount serving as an object is a mount which is obtained by the division and corresponds to the position of the tag having already been attached onto the original mount.

In step S2406, the tag on the original mount is changed to a tag having a link to the specific tag. This is a process of generating a link to the specific tag generated in step S2404 in the tag having already been attached onto the original mount. As described above, the tag may be given a link to the working mount after division.

In step S2408, it is determined whether or not is there a working mount not having a specific tag in the working mount after division. In a case where a working mount not having a specific tag is present, the processing proceeds to step S2410. Otherwise, the processing returns to step S2402. In a case where tags corresponding to all of the working mounts after division are already present so as to correspond to the original mount, the processing returns to step S2402. In a case where tags on the original mount are insufficient, the processing proceeds to step S2410.

In step S2410, a specific tag is generated and attached onto the working mount.

In step S2412, a tag having a link to the specific tag generated in step S2410 is generated in the original mount.

In step S2414, the position of the tag in the original mount is determined in accordance with a division position, and the tag generated in step S2412 is attached to the original mount. Then, the processing returns to step S2408.

Figure 25A:
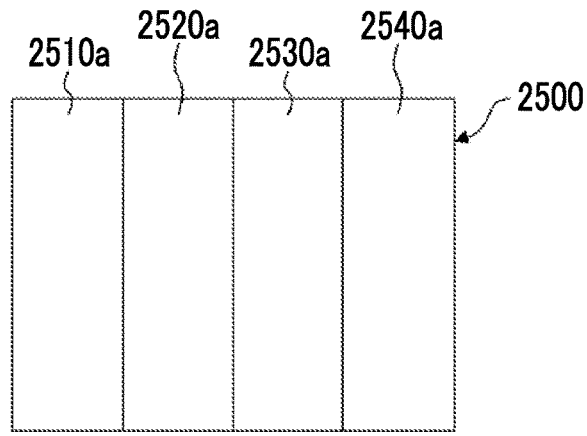
FIGS. 25A to 25C are diagrams illustrating a processing example according to the second exemplary embodiment.
Figure 25B:
Figure 25C:
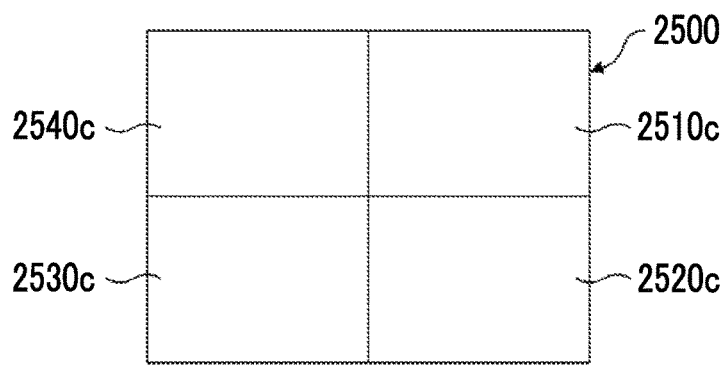

FIGS. 25A to 25C are diagrams illustrating a processing example according to the second exemplary embodiment. The diagrams show a configuration example of division.

In the example of FIG. 25A, a shared mount (a mount before division) 2500 is divided into a working mount (a mount after division) 2510a, a working mount (a mount after division) 2520a, a working mount (a mount after division) 2530a, and a working mount (a mount after division) 2540a from the left to the right.

In the example of FIG. 25B, the shared mount (the mount before division) 2500 is divided into a working mount (a mount after division) 2510b, a working mount (a mount after division) 2520b, a working mount (a mount after division) 2530b, and a working mount (a mount after division) 2540b from the top to the bottom.

In the example of FIG. 25C, the shared mount (the mount before division) 2500 is divided into a working mount (a mount after division) 2510c, a working mount (a mount after division) 2520c, a working mount (a mount after division) 2530c, and a working mount (a mount after division) 2540c clockwise from the upper right side.

Naturally, the number of working mounts obtained by division may be another number, and another division configuration may be adopted.

In each mount before division, four tags having a link to the mount after division (or a specific tag within the mount after division) are attached to positions of the respective mounts after division (in a case where a tag has already been provided for each divided region, the tag is given a link), and a specific tag having a link to the tag within the mount before division is attached to each mount after division.

In this exemplary embodiment, a description has been given of an example in which the movement or copying of tag is performed after plural mounts are connected to each other, but other operations may be performed. The other operations include an operation of selecting plural tags between plural mounts, such as an operation of giving a relationship between tags, an operation of arranging plural tags to form a group, an operation of giving the same property to plural tags at once, and an operation of designating a tag to be retrieved. According to this exemplary embodiment, individual tags in plural mounts can be selected by one operation. Further, in this case, the operation of selecting plural tags can be performed by the same operation as the selection of plural tags within one mount in the related art, even in a case of the selection of tags between mounts. Thus, it is possible to easily perform an operation, similar to a case of movement or copying.

Figure 26:
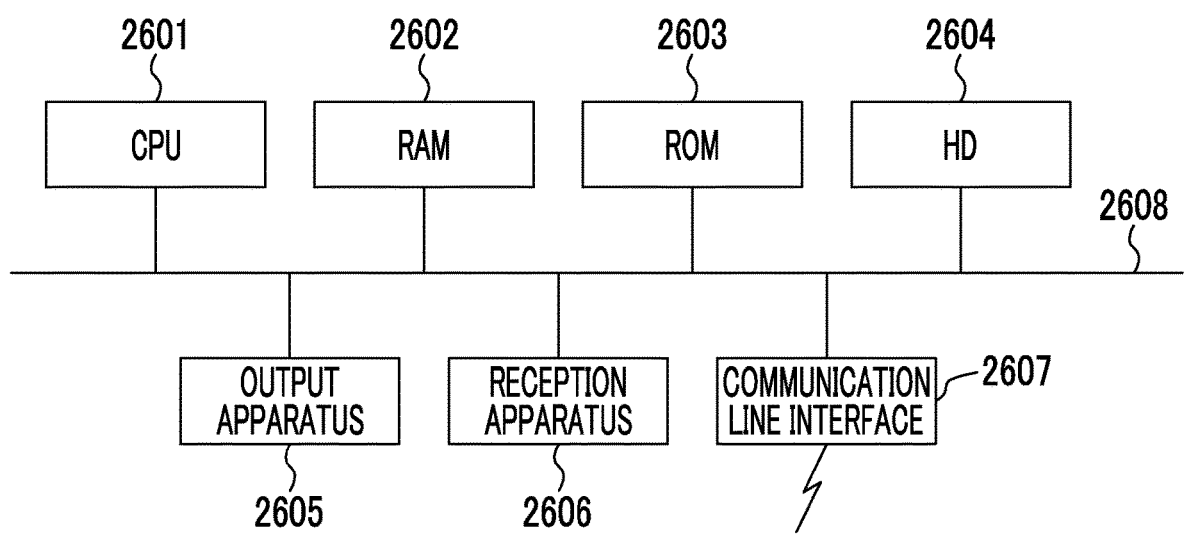
FIG. 26 is a block diagram illustrating a hardware configuration example of a computer for realizing this exemplary embodiment.

Meanwhile, a hardware configuration of a computer executing a program as this exemplary embodiment is a general computer as illustrated in FIG. 26, and specifically, is a personal computer, a computer that may serve as a server, or the like. That is, as a specific example, a CPU 2601 is used as a processing unit (computational unit), and a RAM 2602, a ROM 2603, and an HD 2604 are used as storage apparatuses. As the HD 2604, for example, a hard disk or a Solid State Drive (SSD) may be used. The computer includes the CPU 2601 that executes programs such as the tag information recording module 110, the tag screen display module 120, the tag operation processing module 125, the tag screen control module 130, the tag position determination module 135, the mount connection control module 140, the mount division operation module 1735, the mount division control module 1740, the specific tag presence determination module 1745, and the tag generation module 1750, the RAM 2602 that stores the programs and data, the ROM 2603 that stores programs for starting up the computer, and the like, the HD 2604 which is an auxiliary storage device (may be a flash memory or the like) which has functions as the mount information storage module 105, the tag property information storage module 115, and the tag property information storage module 1715, a reception apparatus 2606 that receives data on the basis of a user's operation (including a motion, a sound, an eye gaze, and the like) with respect to a keyboard, a mouse, a touch screen, a microphone, a camera (including an eye gaze detection camera, and the like), and the like, an output apparatus 2605 such as a CRT, a liquid crystal display, or a speaker, a communication line interface 2607, such as a network interface card, for connection to a communication network, and a bus 2608 for transmitting and receiving data by connecting the above-mentioned components to each other. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 26 shows one configuration example. This exemplary embodiment is not limited to the configuration illustrated in FIG. 26, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 26 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more functions of a scanner, a printer, a copying machine, and a facsimile), and the like, in addition to a personal computer.

This exemplary embodiment has been described as the information processing apparatus and the non-transitory computer readable medium storing an information processing program for facilitating a tag operation across mounts, as compared to a case where a participant sequentially selects mounts which are movement destinations at the time of moving a tag. However, this exemplary embodiment may be ascertained as an information processing apparatus and a non-transitory computer readable medium storing an information processing program which are capable of connecting mounts to each other.

A situation where connection of mounts is effective is, for example, a situation where work for attaching a tag to a mount is performed at an assembly of plural persons. In such work, plural mounts may be desired to be connected to each other. For example, work for connecting worked mounts to each other for each participant to make the participant move a tag from one mount to the other mount may be desired to be performed.

In the comparison processing in the description of the above-described exemplary embodiment, "equal to or larger than", "equal to or less than", "larger than", and "smaller than (less than)" may be respectively set to be "larger than", "smaller than (less than)", "equal to or larger than", and "equal to or smaller than" as long as no inconsistency occurs.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM®), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a screen that displays a first mount, wherein the first mount comprises a plurality of second mounts, and wherein the second mounts are respectively operated by a plurality of electronic tag terminals and related to a plurality of tags;
a connection interface that connects the second mounts to each other in accordance with a relationship between the tags on a first mount, wherein the tags related to the second mounts are attachable to the first mount, wherein when the second mounts are connected to each other, the corresponding electronic tag terminals are accessible to the connected second mounts, and wherein any one or more of a positional relationship in a case where the tags are superimposed on each other and a positional relationship in a case where a distance between the tags is within a predetermined distance is used as the relationship between the tags; and
a processor that moves a designated tag among the tags attached onto one second mount to another second mount among the connected second mounts.

2. The information processing apparatus according to claim 1,
wherein the processor further copies another designated tag among the tags attached onto the one second mount to the another second mount among the connected second mounts.

3. The information processing apparatus according to claim 2,
wherein any one or more of a positional relationship in a case where the tags are superimposed on each other and a positional relationship in a case where a distance between the tags is within a predetermined distance is used as the relationship between the tags.

4. The information processing apparatus according to claim 1, wherein the connection interface determines a side for connecting the second mounts to each other in accordance with the positional relationship to perform the connection.

5. The information processing apparatus according to claim 3,
wherein the connection interface determines a side for connecting the second mounts to each other in accordance with the positional relationship to perform the connection.

6. The information processing apparatus according to claim 1,
wherein a relationship generated by a line for connecting the tags is used as the relationship between the tags.

7. The information processing apparatus according to claim 6,
wherein a side for connecting the second mounts to each other is determined in accordance with a side between the connected tags to perform the connection.

8. The information processing apparatus according to claim 2,
wherein the processor performs an operation of moving or copying the tags across the side connected between the second mounts.

9. The information processing apparatus according to claim 8,
wherein the operation of moving or copying the tags is the same as an operation of moving or copying the tags on the second mount.

10. An information processing apparatus comprising:
a processor, configured to:
divide a first mount displayed on a screen into a plurality of second mounts, wherein the second mounts are respectively operated by a plurality of electronic tag terminals;
in a case where a tag of a plurality of tags is present at a position on the first mount which corresponds to a selected second mount, relate the tag to the selected second mount;
in a case where the tag is not present at the position on the first mount which corresponds to the selected second mount, generate the tag related to the selected second mount thereon and relate the tag to the selected second mount; and
in a case where one second mount and another second mount among the second mounts are connected, move the tag attached onto the one second mount to the another second mount, wherein any one or more of a positional relationship in a case where the tags are superimposed on each other and a positional relationship in a case where a distance between the tags is within a predetermined distance is used as the relationship between the taps.

11. A non-transitory computer readable medium storing an information processing program causing a computer to:
control a screen to display a first mount, wherein the first mount comprises a plurality of second mounts, and wherein the second mounts are respectively operated by a plurality of electronic tag terminals and related to a plurality of tags;
connect the second mounts to each other in accordance with a relationship between the tags on a first mount, wherein the tags related to the second mounts are attachable to the first mount, wherein when the second mounts are connected to each other, the corresponding electronic tag terminals are accessible to the connected second mounts, and wherein any one or more of a positional relationship in a case where the tags are superimposed on each other and a positional relationship in a case where a distance between the tags is within a predetermined distance is used as the relationship between the tags;
move a designated tag among the tags attached onto one second mount to another second mount among the connected second mounts.

12. A non-transitory computer readable medium storing an information processing program causing a computer to:
divide a first mount displayed on a screen into a plurality of second mounts, wherein the second mounts are respectively operated by a plurality of electronic tag terminals;
in a case where a tag of a plurality of tags is present at a position on the first mount which corresponds to a selected second mount, relate the tag to the selected second mount;
in a case where the tag is not present at the position on the first mount which corresponds to the selected second mount, generate the tag related to the selected second mount thereon and relate the tag to the selected second mount; and
in a case where the selected second mount and another second mount among the second mounts are connected, move the tag attached onto the selected second mount to the another second mount, wherein any one or more of a positional relationship in a case where the tags are superimposed on each other and a positional relationship in a case where a distance between the tags is within a predetermined distance is used as the relationship between the tags.

* * * * *